US007792682B2

(12) United States Patent
Johnson

(10) Patent No.: US 7,792,682 B2
(45) Date of Patent: Sep. 7, 2010

(54) INFORMATION ARCHIVAL AND RETRIEVAL SYSTEM FOR INTERNETWORKED COMPUTERS

(76) Inventor: Rodney D. Johnson, 57 Pine St., Needham, MA (US) 02492

(*) Notice: Subject to any disclaimer, the term of this patent is extended or adjusted under 35 U.S.C. 154(b) by 1594 days.

(21) Appl. No.: 09/909,502

(22) Filed: Jul. 19, 2001

(65) Prior Publication Data

US 2002/0010682 A1     Jan. 24, 2002

Related U.S. Application Data

(60) Provisional application No. 60/219,515, filed on Jul. 20, 2000.

(51) Int. Cl.
*G06Q 99/00* (2006.01)
(52) U.S. Cl. .................................................. 705/1.1
(58) Field of Classification Search ................... 705/1.1
See application file for complete search history.

(56) References Cited

U.S. PATENT DOCUMENTS

| | | | |
|---|---|---|---|
| 5,566,331 A | 10/1996 | Irwin, Jr. et al. | 395/600 |
| 6,023,710 A | 2/2000 | Steiner et al. | 707/204 |
| 6,026,437 A | 2/2000 | Muschett et al. | 709/219 |
| 6,115,035 A | 9/2000 | Compton et al. | 345/327 |
| 6,167,453 A | 12/2000 | Becker et al. | 709/245 |
| 6,237,011 B1 | 5/2001 | Ferguson et al. | 707/515 |
| 6,271,840 B1 * | 8/2001 | Finseth et al. | 715/236 |
| 6,282,548 B1 * | 8/2001 | Burner et al. | 707/104.1 |
| 6,625,624 B1 * | 9/2003 | Chen et al. | 707/204 |

FOREIGN PATENT DOCUMENTS

| | | | |
|---|---|---|---|
| EP | 732661 A1 * | 9/1996 | |
| EP | 0907120 | 7/1999 | |
| EP | 1006462 | 7/2000 | |
| EP | 1160692 | 5/2001 | |
| WO | WO 00/08572 | 2/2000 | |
| WO | WO 00/10105 | 2/2000 | |

OTHER PUBLICATIONS www.archive.org; wayback machine; any date Jan. 9, 1998.*
Retrieved from www.archive.org www.internic.net; any linkage Feb. 21, 1999.*
Retrieved from www.archive.org 'www.archive.org' any linkage Jan. 9, 1998.*
Betterwhois.com (www.betterwhois.com, Obtained from Internet Archive <www.archive.org>, date range: Nov. 27, 1999).*
Press Release, "Kessler Introduces Web.Sweep" (Kessler & Associates, Jul. 16, 1998) available at http://www.investigation.com/press/press11.htm.

(Continued)

*Primary Examiner*—Jonathan Ouellette
(74) *Attorney, Agent, or Firm*—The Johnson IP Law Firm; Rodney D. Johnson

(57) ABSTRACT

A computing system can archive information from internetworked computers, such as Internet content, for later retrieval. A server system processes content providers, such as DNS registries and web sites, to extract and store content—including text, image, audio, and video content. For web sites, HTML source code is stored along with a browser-rendered display file. The content is perpetually archived to create a historical record of information for each content provider. An interface is used to retrieve the archived content in response to queries.

117 Claims, 18 Drawing Sheets

OTHER PUBLICATIONS

"Network Query Language: The Content Engineering Era Finally Has a Language", Hurwitz Report (Hurwitz Group, Inc., Sep. 2000).

Hirai, J. et al: "WebBase: a repository of Web pages" *Computer Networks, Elsevier Science Publishers B.V.*, Amsterdam, NL, 33(1-6):277-293 (Jun. 2000).

Simonson, J. et al: "Version augmented URIs for reference permanencevia an Apache module design" *Computer Networks and ISDN Systems*, North Holland Publishing. Amsterdam, NL, 30(1-7):337-345 (Apr. 1, 1998).

Brewster Kahle: "Preserving the Internet" *Scientific American*, pp. 72-73 (Mar. 1, 1997).

Abrahams M.D. et al: "Trials and tribulation of implementing intranet technology: the Cassini Information Access System" 15th. *AIAA/IEEE Digital Avionics Systems Conference*. Atlanta (Oct. 27-31, 1996).

Hawley, C. et al: "Meeting the challenge of electronic communication" *Professional Communication Conference* (1997).

"The Internet Archive: Building an 'Internet Library'—Using the Collections" (Internet Archive; from http://web.archive.org/web/20000622093651/archive.org/using/index.html).

"The Internet Archive: Building an 'Internet Library'—How We Acquire Collections" (Internet Archive; from http://web.archive.org/web/20001018070946/archive.org/collections/acquisition.html).

The Internet Archive: Building an 'Internet Library'—Storage and Preservation of the Collections (Internet Archive; from http://web.archive.org/web/20001101064231/archive.org/collections/storage.html).

WWW Archive File Format Specification, version 1.0 (Internet Archive (Sep. 1996)).

* cited by examiner

```
[whois crsnic net]Whois Server Version 1 3Domain names in the  com,  net, and  org domains can now be registered
with many different competing registrars  Go to http //www internic net
for detailed information     Domain Name  TRIEVE COM
   Registrar  THE NAME IT CORPORATION DBA AITDOMAINS COM
   Whois Server  whois aitdomains com
   Referral URL  http //www aitdomains com
   Name Server  NS0 NAMEIT NET
   Name Server  NS1 NAMEIT NET
   Updated Date  05-aug-2000
The Registry database contains ONLY  COM,  NET,  ORG,  EDU domains and
Registrars

[whois aitdomains com]

The Data in THE AIT DOMAINS CORPORATION ' WHOIS database is provided
by THE AIT DOMAINS  CORPORATION for information purposes, and to assist
persons in obtaining information about or related
to a domain name registration record
THE AIT DOMAINS CORPORATION  does not guarantee its accuracy   By submitting a
WHOIS query, you agree that you will use this Data only for lawful
purposes and that, under no circumstances will you use this Data to
(1) allow, enable, or otherwise support the transmission of mass
unsolicited, commercial advertising or solicitations via e-mail
(spam), or  (2) enable high volume, automated, electronic processes
that apply to THE AIT DOMAINS CORPORATION  (or its systems)

THE AIT DOMAINS CORPORATION reserves the right to modify these terms at any time
By submitting this query, you agree to abide by this policy Registrant Rodney  Johnson
57 Pine Street Needham
MA  US  02492
rdj  home@bigfoot com Phone  781-449-9479
Fax  781-444-3418

Domain Name  trieve com

Administrative Contact
  Rodney  Johnson
  57 Pine Street

Needham
MA  US
02492
rdj  home@bigfoot com

Phone  781-449-9479
Fax  781-444-3418

Technical Contact
  Rodney  Johnson
  57 Pine Street

Needham
MA  US
02492
home@dowjo com

Phone  781-696-3516
Fax  781-444-3418

Billing Contact
  Rodney  Johnson
  57 Pine Street

Needham
MA  US
02492
home@dowjo com

Phone  781-696-3516
Fax  781-444-3418

Record Created on        2000-02-05 12 53 46 000
Record last updated on   2000-08-05 00 13 25 000
Expire on                2002-02-05 12 54 10 000

Domain servers in listed order ns0 nameit net 208 234 1 116
  ns1 nameit net

Register Your Domain at www aitdomains com
```

*FIG.3*

```
<html xmlns:v="urn:schemas-microsoft-com:vml"
xmlns:o="urn:schemas-microsoft-com:office:office"
xmlns:w="urn:schemas-microsoft-com:office:word"
xmlns:dt="uuid:C2F41010-65B3-11d1-A29F-00AA00C14882"
xmlns="http://www.w3.org/TR/REC-html40">

<head>
<meta name="Microsoft Theme 2.00" content="blends 011">
<meta http-equiv=Content-Type content="text/html; charset=windows-1252">
<meta name=ProgId content=Word.Document>
<meta name=Generator content="Microsoft Word 9">
<meta name=Originator content="Microsoft Word 9">
<link rel=File-List href="./Trieve_files/filelist.xml">
<link rel=Edit-Time-Data href="./Trieve_files/editdata.mso">
<!--[if !mso]>
<style>
v\:* {behavior:url(#default#VML);}
o\:* {behavior:url(#default#VML);}
w\:* {behavior:url(#default#VML);}
.shape {behavior:url(#default#VML);}
</style>
<![endif]-->
<title>Trieve Solutions Home</title>
<!--[if gte mso 9]><xml>
 <o:DocumentProperties>
  <o:Author>Rod Johnson</o:Author>
  <o:Template>Normal</o:Template>
  <o:LastAuthor>Rod Johnson</o:LastAuthor>
  <o:Revision>3</o:Revision>
  <o:TotalTime>20</o:TotalTime>
  <o:LastPrinted>2000-09-07T19:33:00Z</o:LastPrinted>
  <o:Created>2000-09-08T04:13:00Z</o:Created>
  <o:LastSaved>2000-09-10T16:10:00Z</o:LastSaved>
  <o:Pages>2</o:Pages>
  <o:Words>215</o:Words>
  <o:Characters>1228</o:Characters>
  <o:Company>HBSR</o:Company>
  <o:Lines>10</o:Lines>
  <o:Paragraphs>2</o:Paragraphs>
  <o:CharactersWithSpaces>1508</o:CharactersWithSpaces>
  <o:Version>9.2720</o:Version>
 </o:DocumentProperties>
</xml><![endif]--><!--[if gte mso 9]><xml>
 <w:WordDocument>
  <w:DisplayHorizontalDrawingGridEvery>0</w:DisplayHorizontalDrawingGridEvery>
  <w:DisplayVerticalDrawingGridEvery>0</w:DisplayVerticalDrawingGridEvery>
  <w:UseMarginsForDrawingGridOrigin/>
  <w:Compatibility>
   <w:FootnoteLayoutLikeWW8/>
   <w:ShapeLayoutLikeWW8/>
   <w:AlignTablesRowByRow/>
   <w:ForgetLastTabAlignment/>
```

...

*FIG. 4* trieve™

Trieve Solutions designs and develops CYBER*trieve*™ technology for archiving and retrieving Internet content. Our AUTO*trieve*™ servers process web sites on a continual basis to extract and store content, including text, image, sound, and video content. Our mission is to archive public Internet content for later retrieval to support the legal and business communities, as well as for use by individual clients.

We perpetually archive content to create a historical record of web site evolution. To that end, our SITE*trieve*™ robots maintain a list of existing domain names: growing with the expansion of the Internet. In addition, our WHO*trieve*™ robots maintain historical Whois information for each domain name. Every public file for every domain name is then indexed and archived by our PAGE*trieve*™ robots. Domain name content is augmented by FIND*trieve*™ robots, which crawl through the Internet, accessing addition web pages.

Retrieval of the data is through our ARC*trieve*™ interface. Various report formats are available to suit our clients' needs. Tired of stale search results from other search engines? Our additional LINK*trieve*™ module can interface with any affiliated search engine to provide historical content for those stale links, or any other hit.

For more information, please contact us.

Please also read our legal notice.

© 2000 Trieve Solutions. All rights reserved.

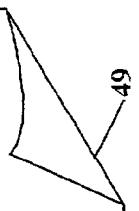

*FIG. 5*

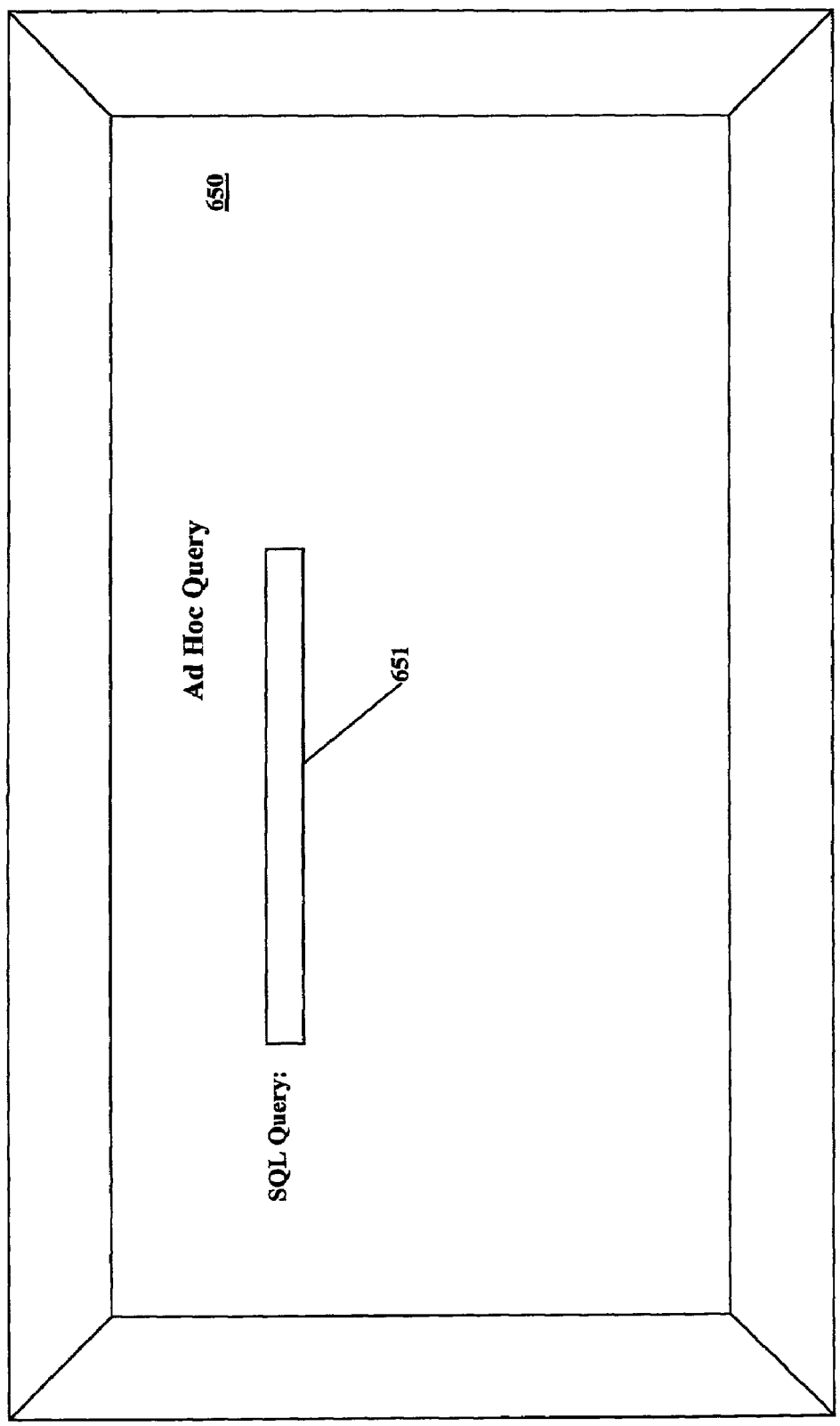

INFORMATION ARCHIVAL AND RETRIEVAL SYSTEM FOR INTERNETWORKED COMPUTERS

RELATED APPLICATION

This application claims the benefit of U.S. Application No. 60/219,515, filed Jul. 20, 2000, the entire teachings of both of which are incorporated herein by reference.

BACKGROUND

The Internet is a vast internetwork of individual computers and computer networks used to share information. Every computer connected to the Internet has a unique Internet Protocol (IP) address. The IP addresses are used to route messages between computers across the Internet and through user networks. Using the IP addresses, any two computers can communicate with one another. In its most basic form, the Internet can be used as a peer-to-peer network. Such a paradigm can be exploited to exchange files between computers, such as File Transport Protocol (FTP) applications. A more common model is the client-server model where web servers store and transmit information, in the form of web pages, to clients upon request. Another application of client-server applications is a newsgroup, where clients can exchange information through a news server.

The Internet, in whatever form, is largely open and unmanaged. Anyone with a computer can connect to the Internet to gather or share information. In addition, any computer can be added to or removed from the Internet at will. Moreover, the information on any given computer can be changed at will. Consequently, the information available on the Internet is extremely fluid.

Because of the Internet s rapidly changing nature, searching for information is limited to viewing snapshots of the Internet. Although many search engines are available to search the Internet, they all suffer from a similar problem. Namely, information found and indexed by a search engine at a particular time may not exist at a later time—when it is needed. Thus, a search engine may report relevant search results but the underlying information may have since been removed from the Internet. A researcher using the search engine can be stymied by stale links to the now nonexistent information.

Eventually, the search engine may purge its database of the old and now nonexistent information. In other words, the search engine may no longer report that the information ever existed. Unless the information reappears, it can be lost forever.

SUMMARY

There are times when a researcher seeks historical records of information. Although news reporting services typically archive news articles, they only archive their own content and may restrict access to the archived data. Unlike professional news services, individual and corporate web sites and other Internet nodes do not publicly archive their content at all. Although a user may backup versions of its web site, the backup copies are controlled by the user and may not be available to others. Those content providers may account for the bulk of the information on the Internet.

The information sought by a searcher can depend on various factors. Typical information includes web site content. The information may also include metatags or internal source coding. The searcher may be an individual researcher looking for specific publications or a professional researcher looking for specific acts on the Internet.

Of particular interest are legal researchers defending intellectual property rights.

For example, a trademark searcher might be interested in all uses of a particular mark, from its use on a web page or its existence in a web page's metatags. A copyright searcher might be interested in the existence of works on web pages. Similarly, a patent searcher might be interested in offers to sell products on web sites. A researcher may also want to trace the evolution of a known web site over time to, for example, measure damages caused by the site. The technology to do these searches, alone or in combination, is not currently available.

A suitable solution has not existed because, in part, of the quantity of data that must be stored. The storage requirements become unmanageable for real-time systems. As long as results do not need to be provided to a user in real time, most of the information can be stored offline.

In accordance with one aspect, the invention can be embodied in a system that stores information for retrieval. The system can include a database, processing modules, and a query engine.

The database stores data in an organized structure. The data can be associated with stored content from internetworked content providers. In particular, an archive can store the stored content in perpetuity. The database can include references to the stored content for retrieval from the archive.

The modules can be used to populate the database with data. The modules can, in turn, be in communication with the content providers, such as over a public access computer network like the Internet. The content providers can include content providers selected from domain name service registries and web servers.

The query engine can be responsible for retrieving the stored content based on a query parameter. The system can further include an indexer, the indexer creating a searchable index of the stored content. In particular, the index is a multimedia indexer. Using these tools, the stored content can be searched based on text, audio, video, or image content.

In accordance with another aspect, the invention can be embodied in a computerized system for the storage and retrieval of content from Internet content providers. The content can include registration content and page content.

The system can include a data warehouse structured to store content for later retrieval. The data warehouse can include a database structure for managing the stored content.

The system can also include a registration retrieval mechanism in communication with Internet registries for retrieving registration content for content providers. The retrieved content can then be stored in the data warehouse.

The system can include a page retrieval mechanism in communication with a content provider for retrieving page content from the content providers. The retrieved page content can then be stored in the data warehouse.

The system can include an indexer for indexing the stored content. A query engine can be coupled to the indexer for retrieving stored content. In particular, the indexer is a multimedia indexer. A user can thus find stored content based on text, audio, video, or image content. Furthermore, the query engine includes a program interface operable by a remote computer.

In accordance with another aspect, the invention can be embodied in a computerized system for archiving information from internetworked web content providers.

In this system, an identifier of a web content provider can be stored in a data warehouse. The identifier can be a unique address of the web content provider, such as a domain name or IP address. The domain name can be derived from a domain name registry. The data warehouse can include an offline storage medium.

For the web content provider, other information stored in the data warehouse can include a copy of registration data, a copy of source code for operating a web browser, and a copy of a browser-rendered display generated by the source code files. The stored information can include a copy of a multimedia file. To save storage space, the stored information can be compressed by a compression algorithm.

A database can then associate the web content provider with the stored information. An indexer can also be provided to operate on the stored information. In particular, the indexer can include a digital signature engine operating on multimedia files.

The system can also include a user interface for querying the data warehouse. The user interface can be operable by a remote computer, such as through includes a third-party search engine interface.

In particular, the system can include web robots to retrieve information from a remote content provider. The remote content provider can be a registry storing the registration data or the web content provider storing the source code. The web content provider and the registry can support a protocol to facilitate the archival of information.

The system can further include a processing module to monitor changes to source code at the web content provider, based on the stored source code. In particular, the data warehouse stores a prior version and a current version of a changed source code file.

The system can further include a processing module to monitor changes to registration data at a registration content provider based on the stored registration data. In particular, the data warehouse stores a prior version and a current version of changed registration data.

In accordance with yet another aspect, the invention can be embodied in a computerized system for archiving data from distinct content providers, each associated with at least one publicly accessible file representing content. The system can include an identification for each content provider of multiple content providers and a mechanism that stores, for each identified content provider, the content of at least one publicly accessible file in a data archive for later retrieval. The stored content can be maintained in perpetuity.

In particular, the content providers are registered in a shared registry system. In addition, the at least one publicly accessible file includes registration data associated with the registry. The content provider can be identified by a unique address, such as a domain name or IP address.

The mechanism can include a data compression algorithm to reduce the size of the at least one file before storing the content in the data archive.

A database structure can be employed to associate each content provider with its stored content. The database structure can, in particular, track changes to the stored content over time.

The system can further include an indexer for maintaining a searchable index of the stored content. In particular, the indexer supports multimedia content. A query engine can be coupled to the indexer for processing queries against the stored content. The query engine can include a program interface operable by a remote computer.

In accordance with another aspect, the invention can be embodied in a computerized system for retrieving information from internetworked content providers. The system can include a user interface and a query result.

The user interface can be in communication with a data warehouse having stored information. The data warehouse can be located remote from the user interface. The user interface can be used to solicit a query from a user. The query can solicit at least one of an Internet domain name, a Universal Resource Locator, a text string, or a multimedia target. The user interface can, in particular, be a third-party search engine result identifying a Universal Resource Locator, which is responsive to the solicitation for a query.

A query result can then be presented to the user in response to the query. The query result can include obsolete information associated with a content provider. The query result can include a history of the information. The history can include changes to the information over time. The changes can include changes to an Internet domain name registration or changes to information stored at a specified address. The query result need not be presented in real time, instead requiring delayed access to offline storage.

The system can be particular useful for identifying users of intellectual property. In this regard, the query results are responsive to a query specifying a trademark (or service mark) or to a query specifying a work of authorship.

A more particular aspect of the invention can be embodied in a user interface for monitoring intellectual property rights across internetworked content providers. The user interface can include a query interface to solicit information related to an intellectual property right and a report responsive to the query information, the report including archived information associated at least one content provider.

The solicited information can be at least one of a trademark (or service mark), a work of authorship, or an invention. The solicited information can be entered as a file location. The file can be at least one of a text file, an audio file, an image file, or a video file.

The report can include archived information associated with multiple network registrars. Likewise, the report can include archived information from multiple web content providers. The archived information can, in particular, include obsolete information.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an exemplary Whois file of FIG. 2.

FIG. 4 illustrates an exemplary source code file of FIG. 2.

FIG. 5 illustrates an exemplary browser-rendered file of FIG. 2.

FIG. 16 illustrates an exemplary user interface for the ad hoc query method of FIG. 9.

DETAILED DESCRIPTION

Figure 1:
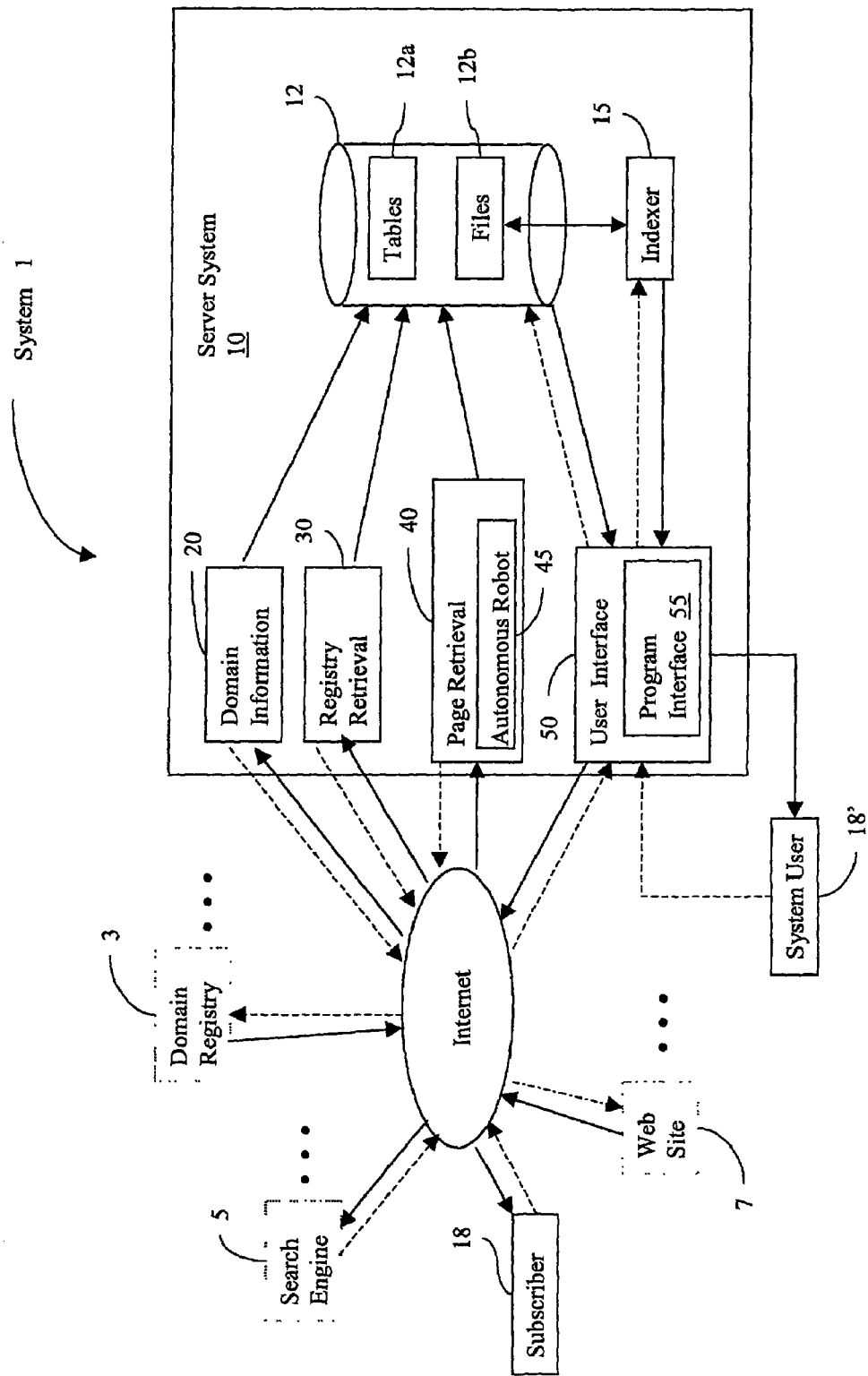
FIG. 1 is a schematic block diagram of a data archival and retrieval system for internetworked computers.

FIG. 1 is a schematic block diagram of a data archival and retrieval system for internetworked computers. The archival and retrieval system 1 includes a server system 10 in communication with a publicly accessible communication system, such as the Internet 2. The Internet interconnects a plurality of computers and computer networks. Those computers include, but are not limited to, Domain Name Service (DNS) Registries 3, Internet (third-party) search engines 5, and World Wide Web (WWW) servers 7. Also shown is a subscriber 18, who is authorized to use the services of the server system 10.

The server system 10 can be a clustered network of computers. The server system 10 stores information content from the Internet, such as web site data, for later retrieval. The data is stored in control database tables 12a and in files 12b of a data warehouse 12 accessible by a plurality of storage and retrieval modules. The data warehouse can be particularly suited to store multimedia data, such as Oracle interMedia for Oracle 8i, commercially available from Oracle Corporation of Redwood Shores, Calif. In a particular embodiment of the warehouse 12, the tables 12a are stored in a medium directly coupled to the server 10, such as a disk drive. In another embodiment, the files 12b are not directly coupled to the server 10, relying on delayed retrieval and access, such as through a manual or automated mechanical system. The length of time needed to retrieve information, however, does not limit the usefulness of the system.

A domain information module 20 is responsible for identifying web sites for archiving. A registry retrieval module 30 is responsible for obtaining domain name registry WHOIS information on domain names. The resulting content from various DNS registries is stored in the warehouse 12.

A page retrieval module 40 is responsible for accessing individual web site pages and archiving the available information content in the warehouse 12. In general, the page retrieval module 40 is driven by domain name information provided by the domain information module 20. The page retrieval module 40 can also include a spider or an autonomous crawler robot 45 for independently identifying Internet resources, such as web pages, to archive. Because there are currently many Internet search engines in use that also identify web pages, the search engines can feed that data to the system. An indexer 15 creates and maintains a full-text, searchable index of the archived information.

User access to the archived information in the warehouse 12 (tables 12a and files 12b) is managed by a user interface module 50. User access can be provided online to the subscriber 18 or offline via a system user 18' to produce query reports. Both the subscriber 18 and system user 18' can perform queries of the data warehouse 12.

A program interface sub-module 55 of the user interface module 50 provides access to archived information associated with a given Universal Resource Locator (URL) page. The program interface sub-module 55 can also be accessed by the subscriber 18 and the system user 18'. In addition, Internet search engines 5 can subscribe to provide access to the URL-based program interface sub-module 55 to provide their users with the benefits of the archived information.

Figure 2:
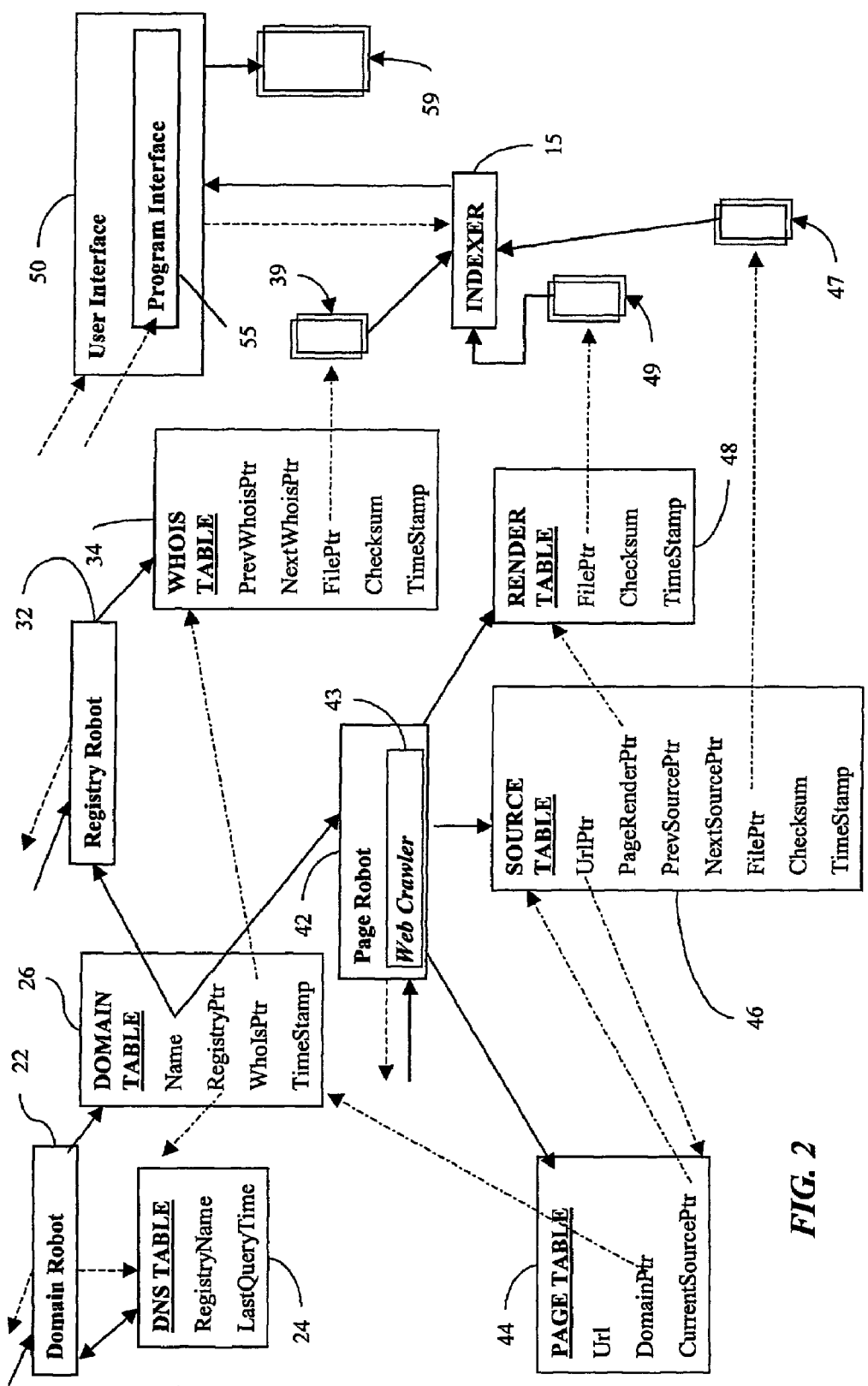
FIG. 2 is a detailed block diagram of portions of the server system of FIG. 1.

FIG. 2 is a detailed block diagram of the server system of FIG. 1. As shown, the server system automatically archives web pages and other Internet resources using software robots. In a basic embodiment, the archive is driven by DNS registry data.

The domain information module 20 includes a domain information robot 22, a Registry Table 24, and a Domain Table 26. The registry retrieval module 30 includes a registry retrieval robot 32, a Whois Table 34, and a plurality of Whois files 39. The page retrieval module 40 includes a page retrieval robot 42, an optional autonomous page retrieval robot 43, a Page Table 44, a Source Table 46, a plurality of source files 47, a Render Table 48, and a plurality of rendered files 49.

The domain information robot 22 is responsible for querying the DNS registries for domain names. The Registry Table 24 maintains query data for each known domain name registry. Each record in the Registry Table 24 includes a RegistryName text field, a LastQueryTime date field, and a QueryTime date field. As illustrated, the domain information robot 22 queries the Registry Table 24, accesses data from the table, and updates the table data. Based on the Registry Table fields, the domain information robot 22 queries the appropriate domain registry. The table data can also be populated from other sources, including bulk data and autonomous spiders or crawlers.

The domain information robot 22 stores data received from the registries in the Domain Table 26. Each record in the Domain Table 26 includes a RegistryPtr pointer field, a DomainName text field, a WhoisPtr pointer field, and a TimeStamp date field. The Domain Table 26 stores the data that drives much of the archival process.

For each record in the Domain Table 26, the registry retrieval robot 32 reads data from the DomainName and RegistryPtr fields and performs a WHOIS query on that domain name in the appropriate registry. The data can also be extracted from a bulk data file. The resulting Whois information is stored in a simple text format as a Whois file 39, which can be compressed to save storage space. Information about the Whois file 39 is maintained in the Whois Table 34.

FIG. 3 illustrates an exemplary Whois file 39 of FIG. 2. As shown, various data fields stored by the registrar are provided in response to the query, including the identity of the named registrant. As further shown, the Whois query includes extraneous text supplied by the registrar. The extraneous text can be stored but may be filtered from the file before storing, especially if the registrar may frequently change the text.

Each Whois file 39 has a respective record in the Whois Table 34. Each record in the Whois Table 34 includes a Checksum integer field, a FilePtr pointer field, a PrevPtr pointer field, a NextPtr pointer field, and a TimeStamp date field. For each Whois file, a checksum is computed and stored in the Checksum field to authenticate the stored Whois file 39. The PrevPtr and NextPtr fields are used to create a chain of Whois records for a particular domain name. That is, a history report of Whois data can be requested and generated from the Whois Table 34 data, even if the domain name registrant transfers from registrar to registrar.

The DomainName field of the Domain Table 26 also seeds the page retrieval robot 42. Using the domain name, the page retrieval robot 42 accesses the domain and retrieves all pages in that domain. Of particular interest is the WWW third level domain, but other third level domains can be processed using a similar method. The page retrieval robot 42 downloads the page source files (e.g. HTML, JPEG, WAV, MPEG, MP3 files) and also the browser-displayed rendition of the pages (when applicable) and stores them as source files 47 and rendered files 49, respectively.

FIG. 4 illustrates an exemplary source code file 47 of FIG. 2. As shown, the file 47 is an HTML file. In addition to source for the displayed text, metatags are also on the file and indexable. Other file formats are also supported.

FIG. 5 illustrates an exemplary browser-rendered file 49 for the source code file of FIG. 4. The rendition is generated from the source code by the browser code.

Each page is identified by its URL. Each URL has an individual record in the Page Table 44. The fields in the Page Table 44 include a URL text field, a DomainPtr pointer field, and a CurrentSourcePtr pointer field. The DomainPtr points to the appropriate Domain Table 26 record for the URL. The CurrentSourcePtr points to an appropriate record in the Source Table 46.

The Source Table 46 associates a database record with a stored source file 47 and is populated by the page retrieval robot 42. The Source Table 46 includes a Url1Ptr pointer field, a Checksum integer field, a PageRenderPtr pointer field, a PrevSourcePtr pointer field, a NextSourcePtr pointer field, a FilePtr pointer field, and a TimeStamp date field. The UrlPtr points to the associated record in the Page Table 44. The Checksum field stores the computed checksum of the source file 47, which is pointed to by the FilePtr field. The PrevSourcePtr and NextSourcePtr fields point to previous and next records in the history chain of the URL. The PageRenderPtr points to an associated record in the Render Table 48.

The Render Table 48 associates a database record with the stored rendered file 49. The Render Table 48 includes a Checksum integer field, a FilePtr pointer field, and a TimeStamp date field. As above, the Checksum field stores a computed checksum of the associated rendered file 49, which is pointed to by the FilePtr field.

The autonomous page retrieval robot 43 can be useful in identifying pages stored under other than WWW third-level domains, such as "ftp", "people", "sales", etc. In this regard, the autonomous page retrieval robot 43 can operate as a standard spider—following links from URL to URL—populating the Page Table 44 as it proceeds. This technique can be particularly useful when the third-level domain is unusual. The system can also make use of web site registration as is commonly used by prior art Internet search engines.

The Indexer 15 maintains a searchable full-content index of the Whois files 39, the source files 47, and the rendered files 49. The Indexer 15 can be any suitable commercially-available indexer that can index the stored files. Those files can then be compressed for archival storage. In a particular embodiment, the rendered files 49 are stored in Adobe Public Display Format (PDF) for portability. The conversion from the native format to the compressed format is accomplished by the registry retrieval and the page retrieval robots during the download process. The checksums are computed from the native Whois files, source files, and generated renditions before being compressed into the archived files 39, 47, 49.

The user interface module 50 receives user requests and responds with reports 59. The user interface module 50 is generally used for broad queries of the stored files 39, 47, 49. For example, a user may be interested in all files that contain the trademark TRIEVE. The full-text index would be used to identify all such files and the user interface module would prepare a report of those files. This solution would report all web sites and domain names, for example, that use the trademark in displayed text as well as undisplayed text, such as metatags.

Using a suitable image signature engine, the indexer 15 can index and search both image source files and rendered pages to identify trademark (including service mark) use in images to combat cyberstuffing and to identify digital signatures and watermarks from works if authorship to combat copyright infringement. A particular image signature engine suitable for computing digital signatures of and indexing image files is Visual Image Retrieval from Virage, Inc of San Mateo, Calif. A particular embodiment of the Virage technology is embodied in Oracle 8*i* Visual Image Retrieval, commercially available from Oracle Corporation. Similarly, signatures can be generated for other multimedia content, such as audio and video data. For example, the VideoLogger program commercially available from Virage, Inc. can be integrated with the Oracle database to facilitate indexing of video content. A suitable audio recognition and signature engine is TRM, commercially available from Relatable, LLC of Alexandria, Va.

The program interface module 55 provides narrow reports about a particular URL, or second-level domain name. For example, a user may be interested in a detailed history of a specific URL for a web page on its web server. The resulting report 59 can provide step-by-step details of the page's evolution over time, including ownership information and source HTML.

It is recognized that information may exist on some web sites longer than others. For example, news sites can be continuously updated throughout a day, while personal web sites may go months without an update. The page retrieval module 40 can be triggered to access certain identified sites on an accelerated schedule. For most sites, an access interval of a few days should be sufficient. Alternatively, the server 10 and the page can support a common protocol, where changes to a page trigger the page retrieval module 40.

In a particular embodiment of the system, the server modules share a common protocol with the content providers 3, 7 so that information can be retrieved easily. It is also recognized that the server modules may have to support multiple protocols and that some content provides 3, 7 may provide no program interface protocols. A suitable language for use on the system is Network Query Language, commercially available from NQL Inc., of South Coast Metro, Calif.

Figure 6:
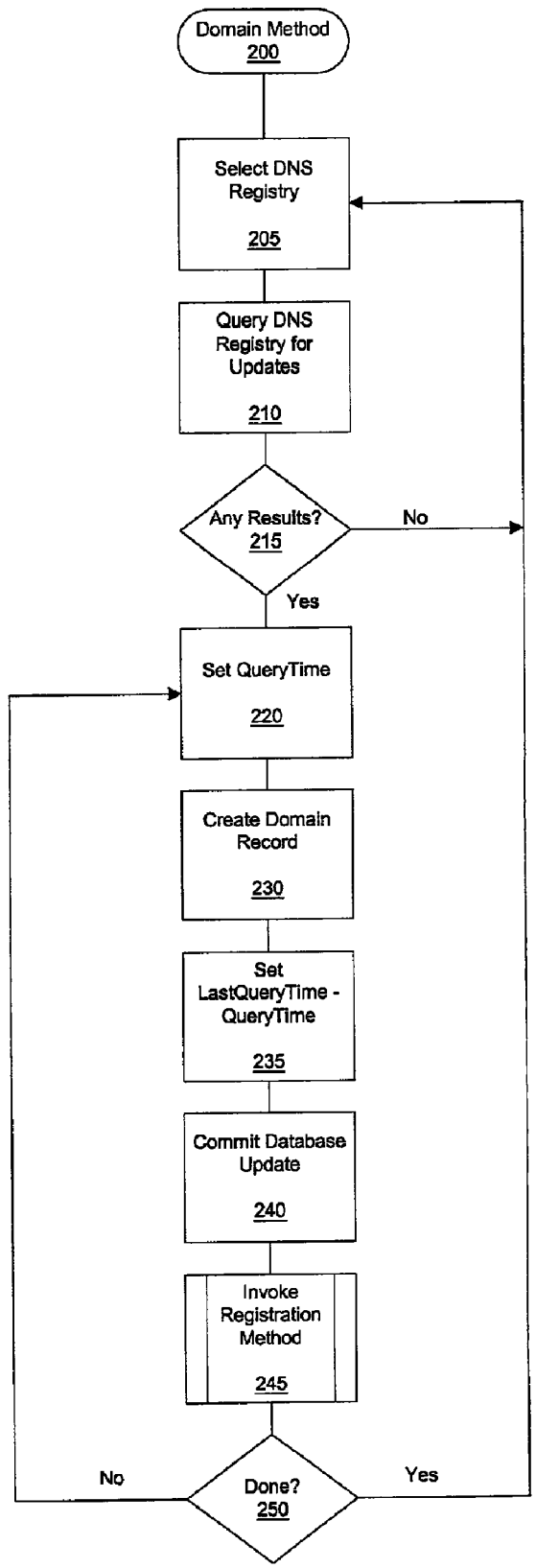
FIG. 6 is a flowchart of the method employed by the domain information robot 22 of FIG. 2.

FIG. 6 is a flowchart of the method employed by the domain information robot 22. The domain method 200 begins a loop at step 205. There the method first selects a DNS RegistryName from the DNS Table. At step 210, the Registry is queried for domain names created since the last such query, stored in the LastQueryTime field of the DNS Table. At step 215, a check for results is made. If no new domains were found, the loop continues by reverting to step 205.

If results were found at step 220, then processing continues to step 225, which starts another loop. At step 225, the QueryTime field in the DNS Table is set to a valid timestamp for the query results, such as the value of a date/time field in the query result header. At step 230, a domain record is created in the Domain Table for the first new domain name. At step 235, the LastQueryTime field is updated with the time of the query, QueryTime. At step 240, the database updates are committed. At step 245, a call is made to the Whois Robot method, passing the domain name, to obtain the related Whois data. At step 250, a check is made to determine if there are other new records. If so, the method reverts to step 225 to process the next domain name; otherwise, the method reverts to step 205 to query another Registry.

Figure 7:
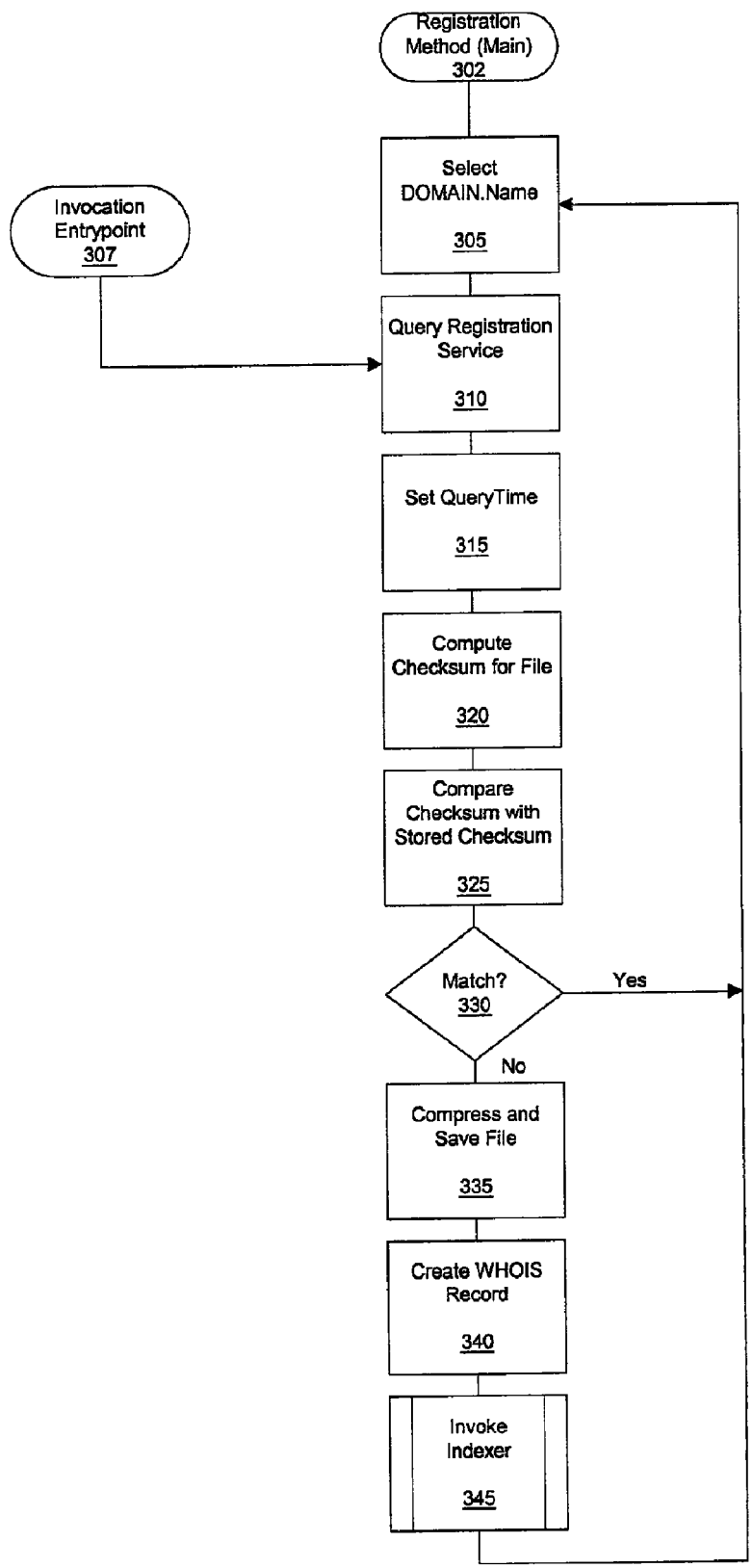
FIG. 7 is a flowchart of the method employed by the registry retrieval robot 32 of FIG. 2.

FIG. 7 is a flowchart of the method employed by the registry retrieval robot 32. The Whois method 300 has two entry points: a main entry point at step 302 and a call interface entry point at step 307. The WHO method 300 can be periodically executed to refresh registry data for previously stored domains.

The main method begins at step 305, where the next DomainName field in the Domain Table is read. At step 310, which is also the first step of the call interface entry 307, the method queries the associated registry, obtained from the RegistryPtr field, using an external interface to the registry database, such as a "WHOIS" service. Next, at step 315, a local variable QueryTime is set to a valid timestamp for the query, such as a value from a query result header.

At step 320, the method computes the checksum of the retrieved Whois file. At step 325, the resulting checksum is compared with the stored Checksum field of the Whois table WHOIS.Checksum. This is done so that an unchanged Whois files is not stored, which would require a new Whois table record. To save space and overhead, only changed files are tracked.

Consequently, a check is made at step 330. If the checksums match, processing reverts to step 305 to process the next Domain name. If there is a difference in the checksums, processing continues to step 335.

At step 335, the file is stored as a compressed PDF file 39. At step 340, a new Whois table record is created for the stored file 39. The fields in the new record are updated with computed checksum and the Query Time stamp. At step 345, the stored Whois 39 file is indexed by calling the Indexer.

Figure 8A:
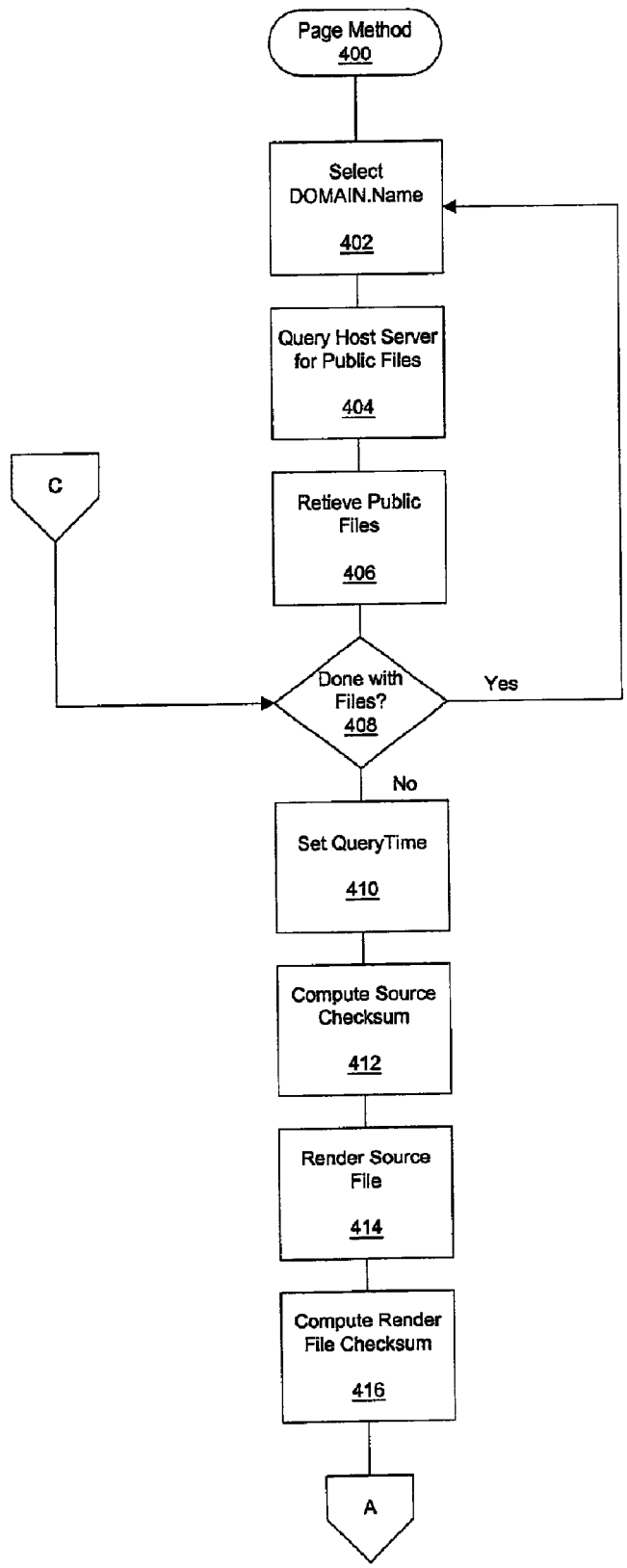
FIGS. 8A-8C are flowcharts of the method of the page retrieval robot 42 of FIG. 2.
Figure 8B:
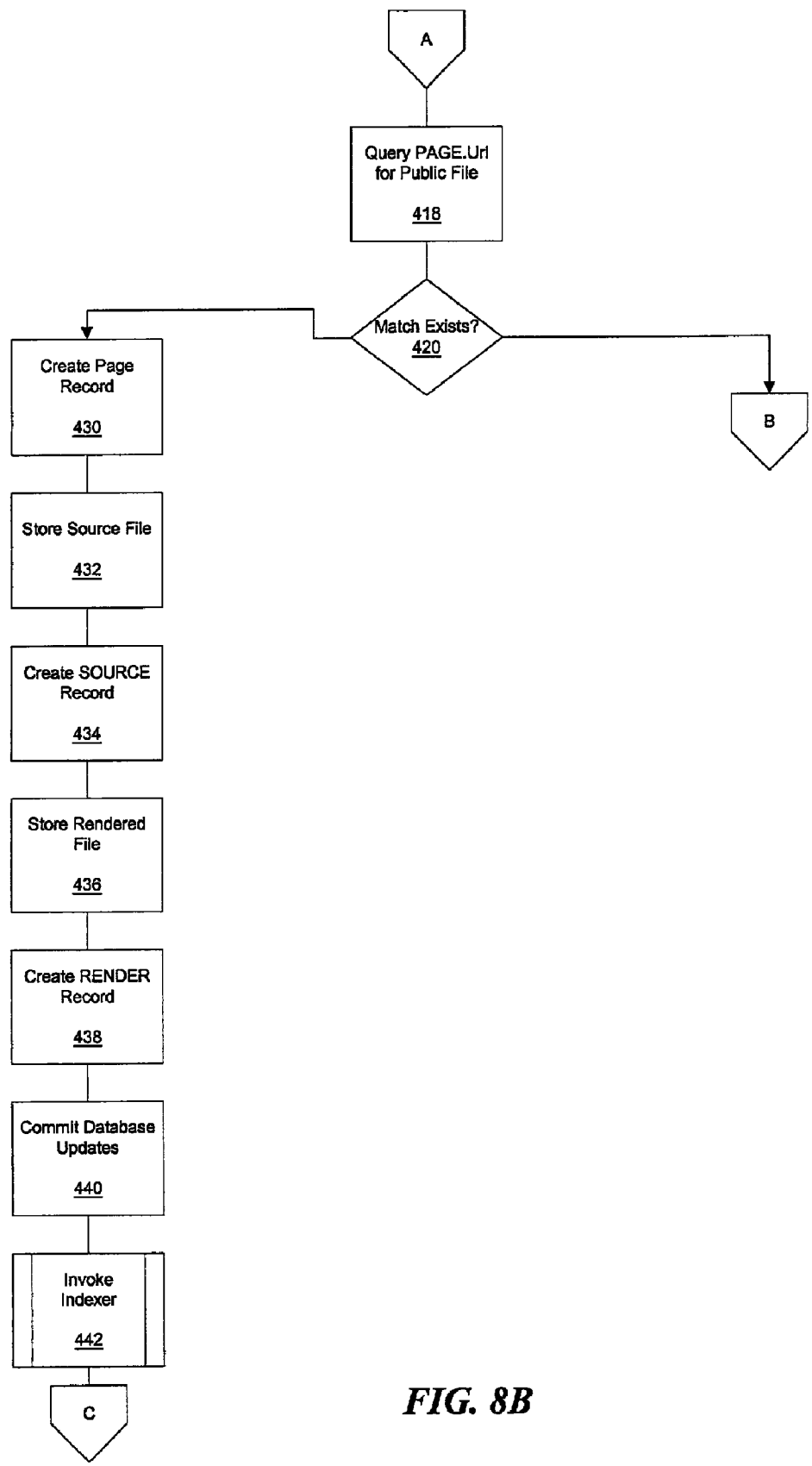
Figure 8C:
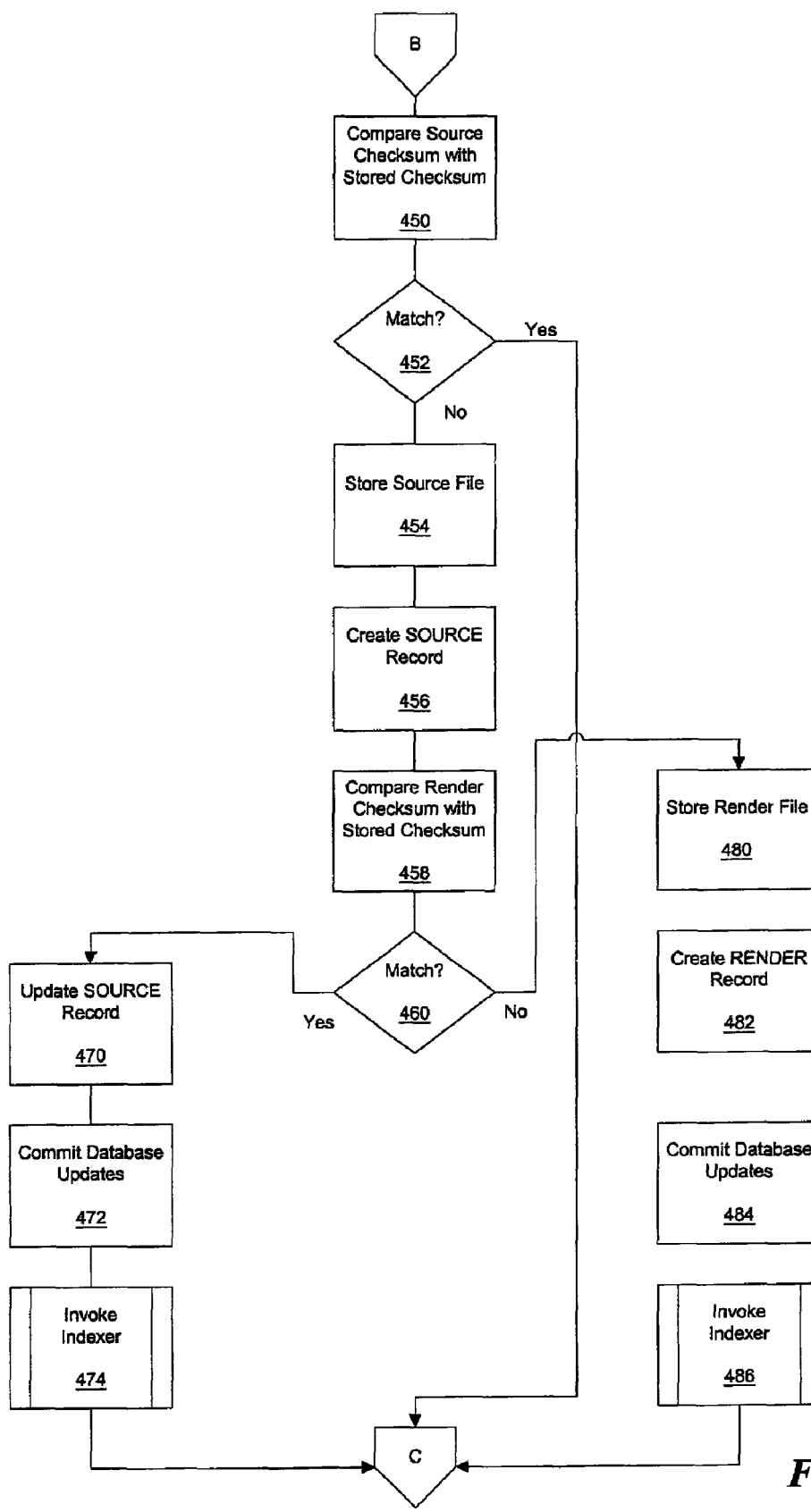

FIGS. 8A-8C are flowcharts of the method of the page retrieval robot 42. The PAGE method 400 begins in FIG. 8A. Beginning at step 402 (FIG. 8A), the method 400 selects the next second level domain from the Domain Table—Domain.Name. The domain server is then queried, at step 404, to reveal public files available from the current second level domain. The domain server returns a list of public files, the source files are retrieved and locally stored at step 406.

A loop through each public file begins at step 408. Once all the public files have been processed for the current second level domain, processing returns to step 402 to select a new second level domain. Processing of individual public files begins at step 410.

At step 410, a local QueryTime field is set to a valid timestamp for the query, such as the date/time field of the query result header, such as the HTTP header. At step 412, a source checksum is computed from the retrieved source file for the public file. At step 414, the source is executed via browser software to yield a rendition of the source, which is locally stored as a rendered file. For completeness, the source file can be separately rendered in each browser explicitly supported by the source code. At step 416, a checksum is computed from the rendered file. Turning to FIG. 8B at step 418, the method queries the Page Table for a URL record—PAGE.Url matching the public file name. If no match is found (step 420), processing jumps to step 430; otherwise processing jumps to step 465 (FIG. 8C).

For a new page there will be no corresponding record in the Page Table. Although it is possible that a preexisting copy of the page has already been stored in the database under a different URL, for simplicity and easy of description, it will be assumed that a renamed source file is stored separately. A removed page will result in a 404 error and the error display can be stored under the URL.

For the new page a new Page Table record is created at step 430. The URL of the new page is stored in the Url field—PAGE.Url. The DomainPtr field is set to point to the Domain Table record of the second level domain. At step 432, the source file is converted to PDF format and stored in the warehouse 12 as a source file 47. A new Source Table record is created at step 434 and pointed to by the PAGE.CurrentSourcePtr field.

In the new Source Table record, the UrlPtr is set to point to the new Page Table record. The Source Table fields can then be populated: the FilePtr points to the stored PDF source file, the Checksum field is set to the computed checksum, and the TimeStamp is set to the QueryTime value. The PrevSourcePtr and the NextSourcePtr are null. At step 436, the rendered file is converted to PDF format and stored in the warehouse 12 as a rendered file 49. A new Render Table record is created at step 438 and pointed to by the SOURCE.PageRenderPtr.

The new Render Table record can now be populated: the FilePtr points to the stored PDF file, the Checksum field is set to the computed checksum, and the TimeStamp is set to the QueryTime value. The updates can now be committed to the database at step 440. At step 442, the indexer is invoked, passing the pointers to the files. Processing then reverts to step 408.

To update preexisting URLs, the method follows the logic starting at step 450 (FIG. 8C). At step 450, the source file checksum is compared with the checksum of the source file pointed to by the Page Table record—namely PAGE.CurrentSourcePtr:FilePtr. If the source checksums match (step 452), the source file has not been modified relative to the stored source file and the database is considered up to date and processing can revert to step 410; otherwise the database must be updated.

To update the database, at step 454, the local source file is converted to PDF format and stored in the warehouse 12 as a source file 47. A new record is created in the Source Table, at step 456, with the FilePtr field pointing to the stored PDF source file, the source checksum stored in the Checksum field, and the QueryTime stored in the TimeStamp field. The PrevSourcePtr is set to point to the prior source record, which has its NextSourcePtr set to point to the new record. The record is not yet related to a Render Table record. Processing then proceeds to step 438 to process the rendered file.

If the source file is new, it cannot be assumed that its rendition is new because much of the changeable text in the source file may not cause a content change. In comparison, the rendition can change without a change in the source file because of counters, banners, or other external content. To conserve storage space and to limit the amount of redundant query results, such non-source related modifications are not stored in the database.

The rendered file is processed in much the same way as the source file. The rendered file checksum is compared, at step 458, with the checksum of the rendered file pointed to by the Page Table record—namely PAGE.CurrentSourcePtr. If the rendered file checksums match, at step 460, then the rendered file has not been modified relative to the stored rendered file; otherwise the new rendered file is stored. In either case, database relationships are updated.

To update the database in the case of an up-to-date rendered file, the Source Table record is updated at step 470. In particular, the PageRenderPtr field is set to point to the current record in the Render Table. Note that there may be more than one Source Table record pointing to the same Render Table record. The many-to-one relationship helps to conserve storage requirements. At step 472, the database updates are committed to the database.

If the rendered file is new, the local rendered file is converted to PDF format and stored in the warehouse 12 at step 480 as a rendered file 49. A new record is created in the Rendered Table, at step 482, with the FilePtr filed pointing to the stored PDF rendered file 49, the rendered file checksum stored in the Checksum field, and the QueryTime stored in the TimeStamp field. In the Source Table, the PageRenderPtr is set to point to this Render Table record. The database relationships between the Page, Source, and Render Tables are now set and the database updates can now be committed to the database at step 484. The method then invokes the indexer 15, at step 486, passing the respective FilePtr fields, to index the contents of the source and rendered files 47, 49.

Processing then loops back to step 410 to process the next file from the domain server. Note that the illustrated method only processes public files and does not mine database data from web sites. Such information, however, could be incorporated into the system by one of ordinary skill in the art.

Figure 9:
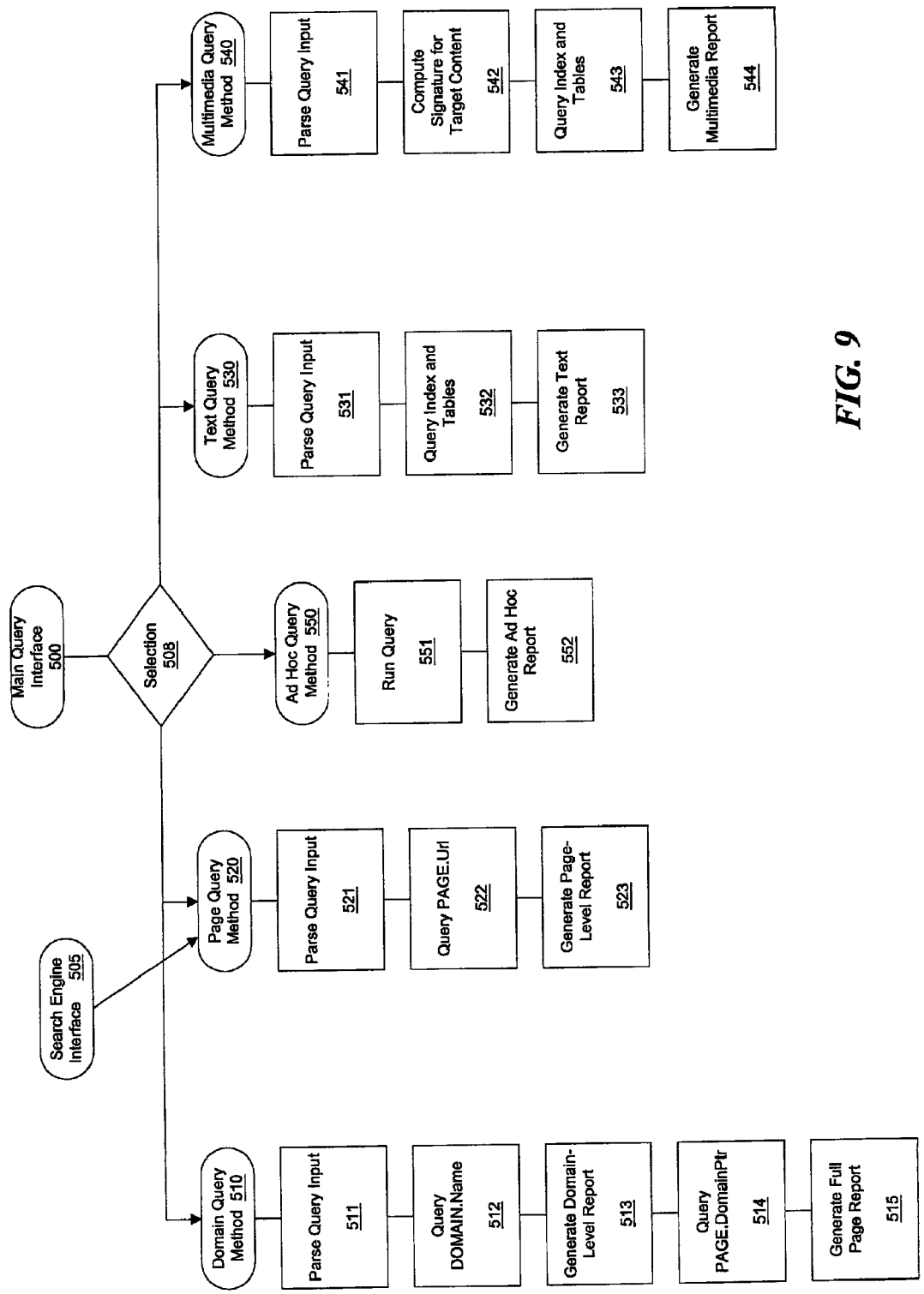
FIG. 9 is a flowchart of the method of the user interface module 50 of FIG. 2.

FIG. 9 is a flowchart of the method of the user interface module 50. A function of the user interface module is to facilitate user access to the archived information at a main interface 500. The method is controlled by a query type selection at step 508, which can include a domain name query 510, page query 520, text query 530, and a multimedia query 540.

Figure 10:
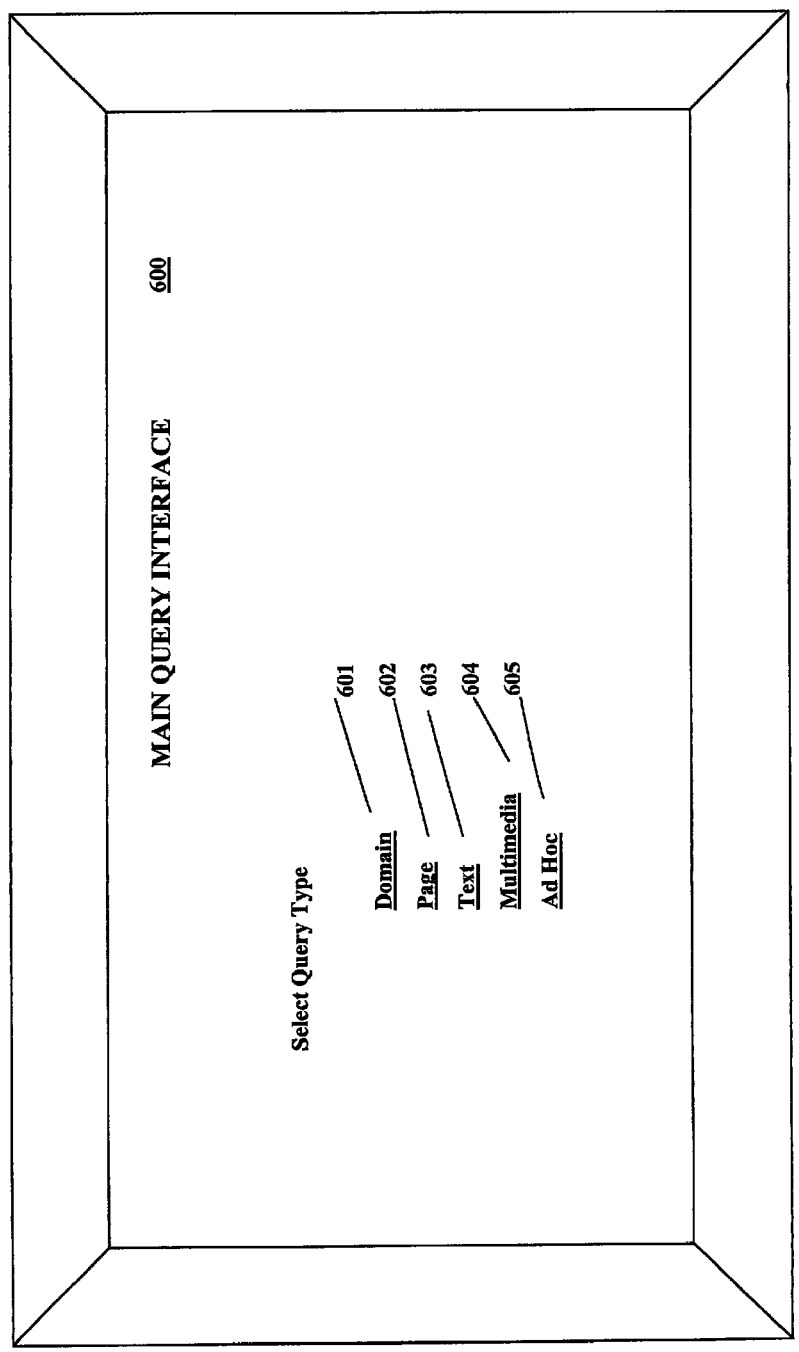
FIG. 10 illustrates an exemplary user interface for the query selection method of FIG. 9.

FIG. 10 illustrates an exemplary user interface for the query selection method of FIG. 9. The interface 600 prompts the user to select one of the query types, each being hyperlinked 601, 602, 603, 604, 605 to a respective query interface.

Returning to FIG. 9, for a domain name query 510, the user provides a second level domain name and possibly other parameters, such as a date range, which are parsed at step 511. The method queries the domain table 26 (FIG. 2) at step 512 and associated stored files to generate a domain registration report at step 513. From the domain results, the page table 44 (FIG. 2) can be queried at step 514 and a report can be generated at step 515 to identify all the pages on a web site. With this query, the state of the web site at a specific time can be reproduced with complete ownership information, and historical source and image content.

Figure 11:
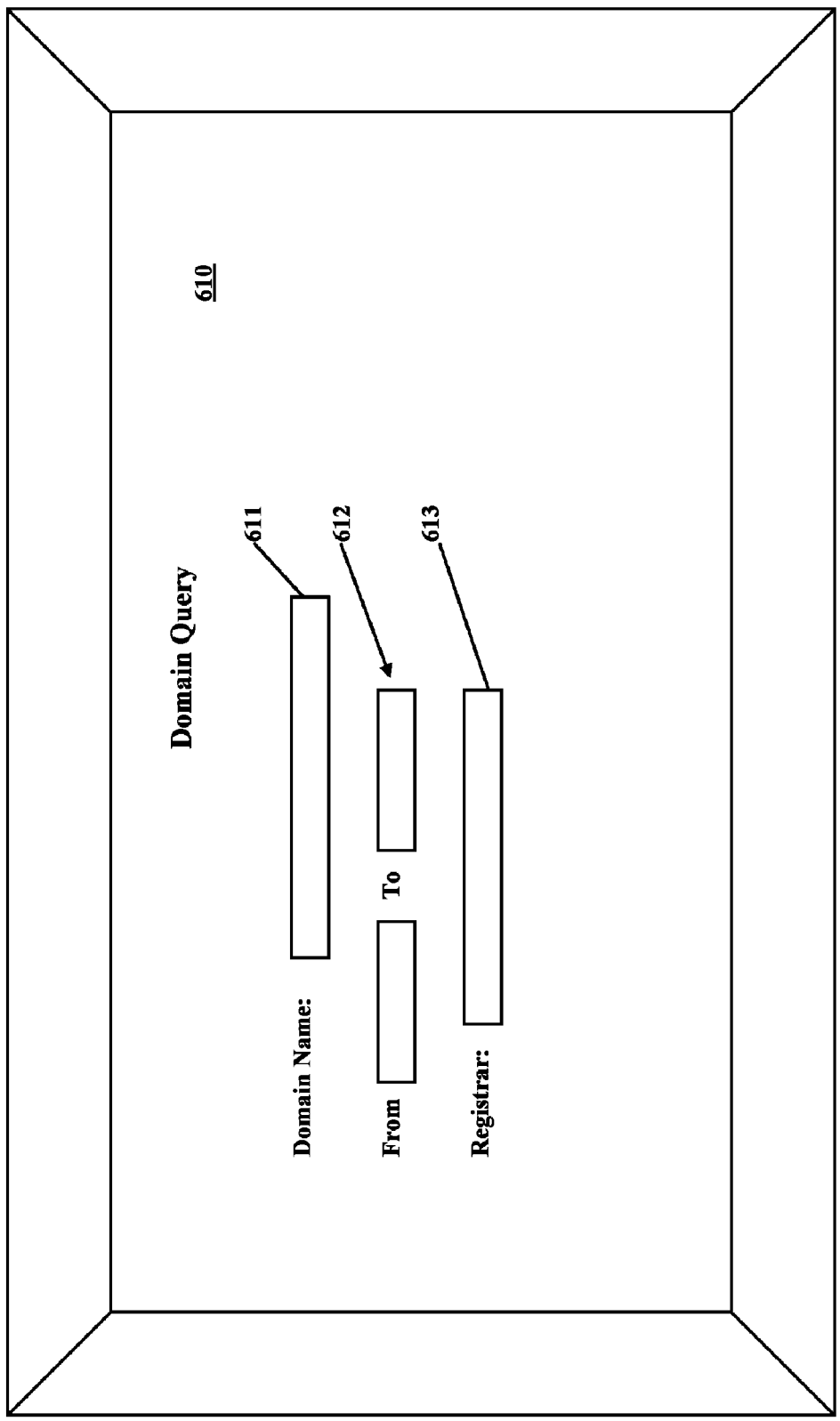
FIG. 11 illustrates an exemplary user interface for the domain query method of FIG. 9.

FIG. 11 illustrates an exemplary user interface for the domain query method of FIG. 9. This interface presents the user with input fields. A domain name 611 is a required input. A date range 612 and registrar 613 fields can be used to narrow the query.

Returning to FIG. 9, for a page query 520, the user provides a specific URL and possibly other parameters, such as a date range, which are parsed at step 521. Here, in particular, the user can be associated with a remote Internet search engine 5 (FIG. 1) through a search engine interface 505. The method 520 queries the Page Table 44 (FIG. 2) to find matching records and associated stored files. From the query result, a report can be generated at step 523 to identify the history of the specific URL. Using this query would allow a user to identify when a particular content was incorporated into the page and how long it had been there.

Figure 12:
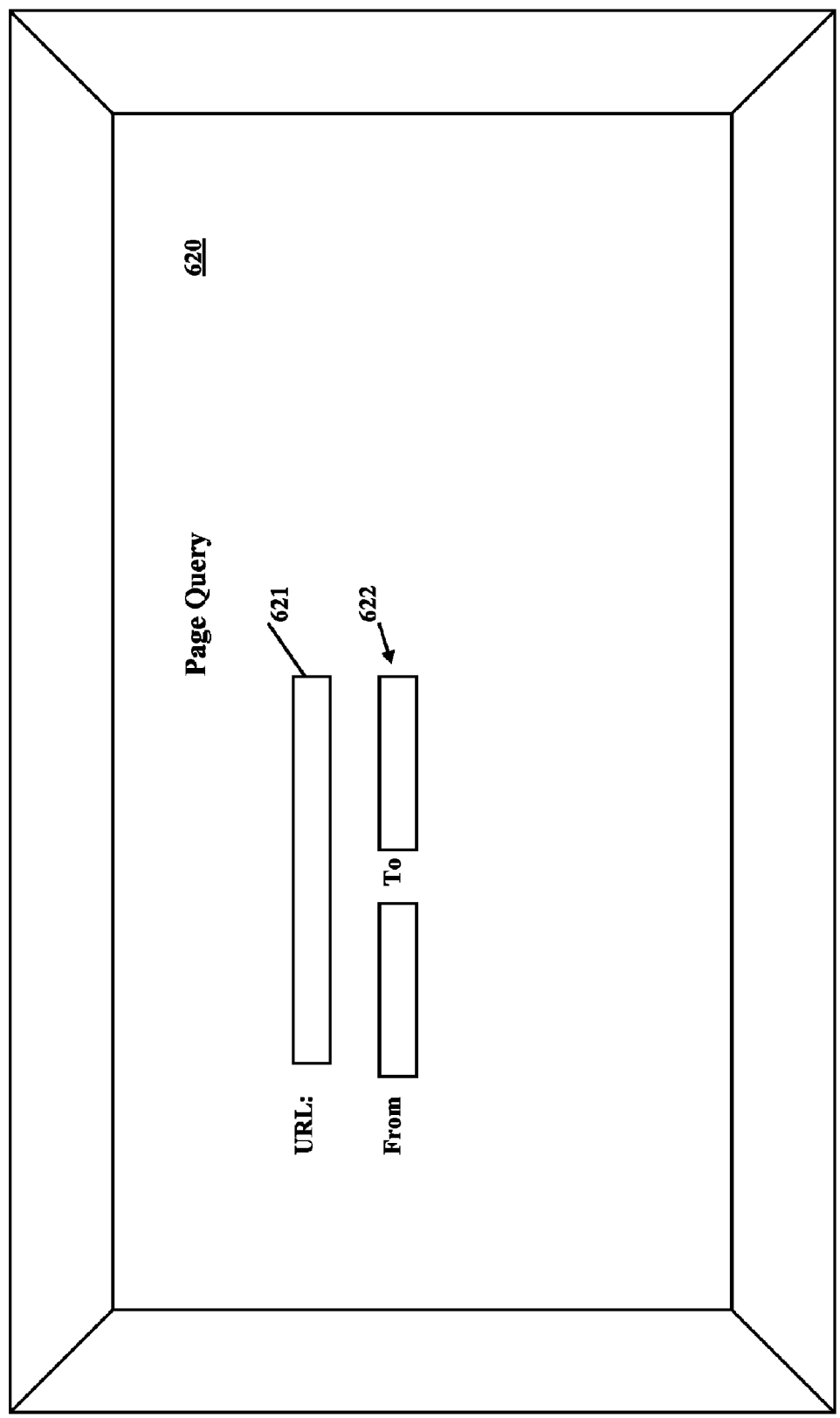
FIG. 12 illustrates an exemplary user interface for the page query method of FIG. 9.

FIG. 12 illustrates an exemplary user interface for the page query method of FIG. 9. This interface 620 also presents the user with input fields. A URL 621 is a required input, with an optional date range 622.

Figure 13:
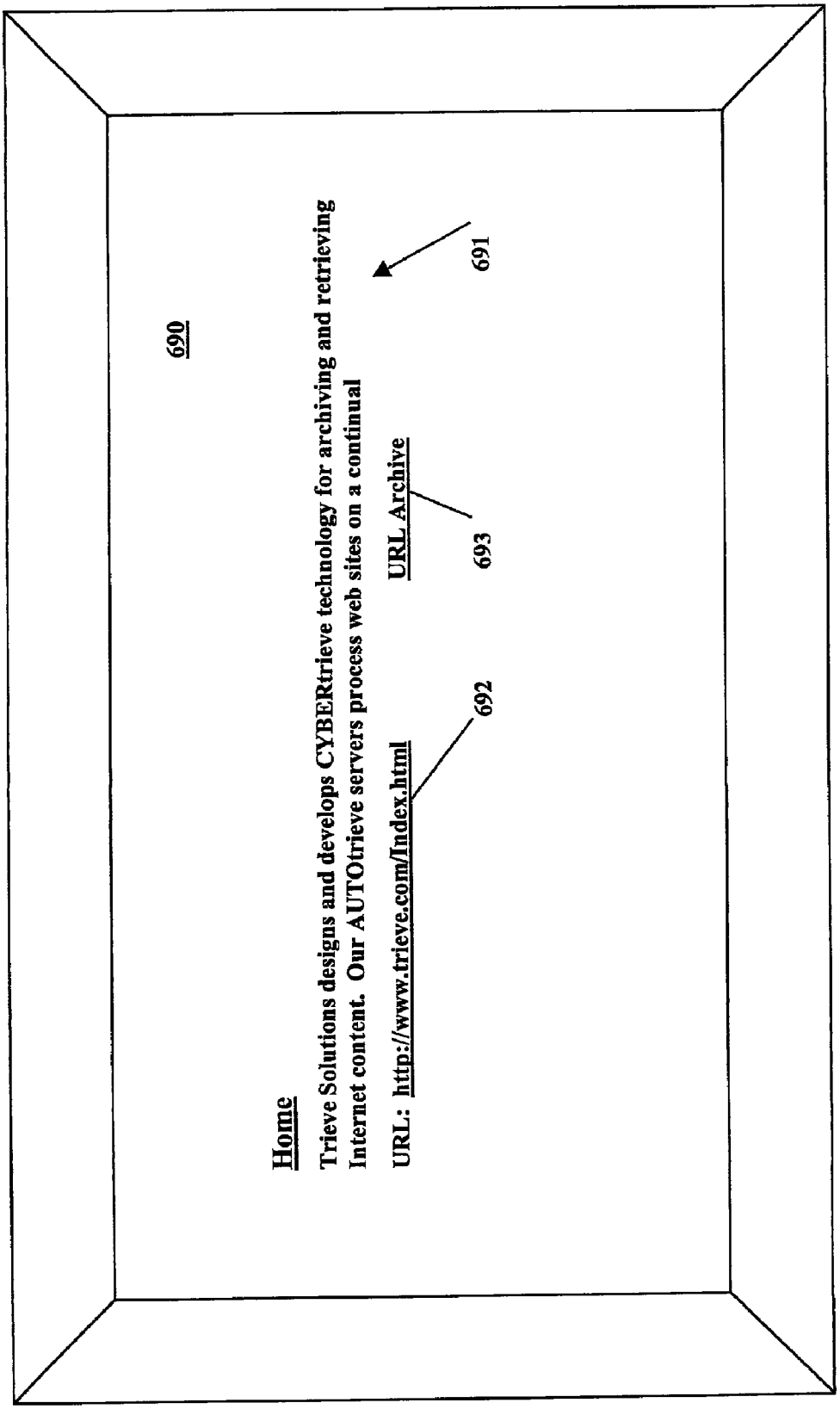
FIG. 13 illustrates an exemplary user interface for the search engine page query method of FIG. 9.

FIG. 13 illustrates an exemplary user interface for the search engine page query method of FIG. 9. Shown is a possible search engine display 690. As with prior art search engines, the display 690 provides a brief description of the identified web page 691 with a hyperlink to the content's URL 692. Also shown is a hyperlink 693 to the page query method 520. The link 693 automatically provides the specified URL as a parameter.

Returning to FIG. 9, for a text query 530, the user provides target text (either directly or indirectly via entry of a file location) and possibly other parameters, such as a date range, which are parsed at step 531. At step 532, the method queries the indexer 15 (FIG. 1), passing the target text, and the database tables 12*a* (FIG. 1), based on the parameters. The indexer returns a list of pointers to stored source files matching the target text. The results from the indexer query and the database query are combined to generate a report to the user at step 534. If the user is an interactive system user, the user can browse the results and modify the query accordingly. To reduce the query effort, the intermediate query results from the indexer query and the database query are temporarily saved, for further use.

The results of the text query can also be filtered by a subcategory, such as registry (Whois) and source. That is, a searcher only interested in Whois records can limit the query results to those records. Likewise, some searchers may only be interested in web page content and limit their results to source and rendered files. Other users, may restrict the results to source files to identify metadata in the source files.

Figure 14:
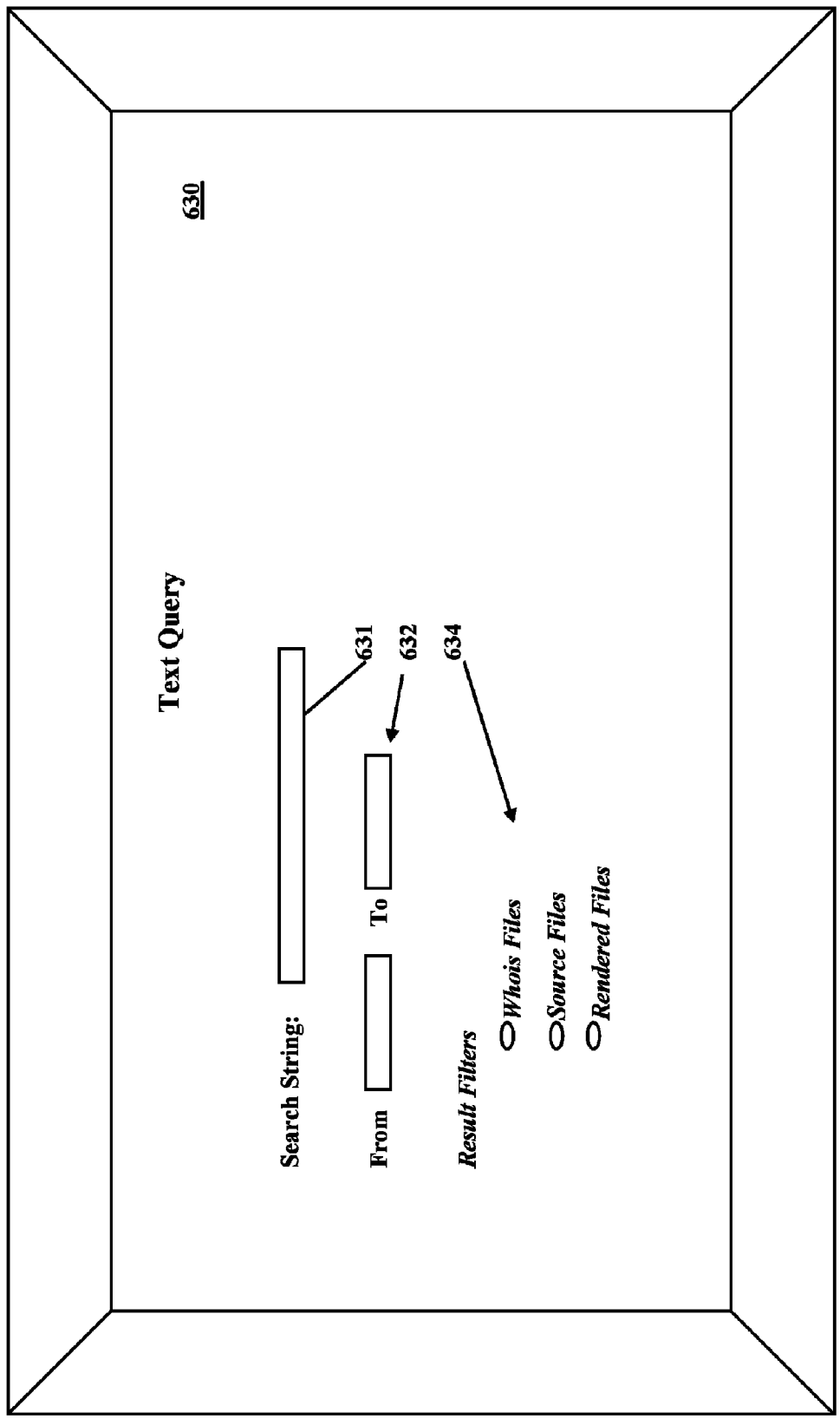
FIG. 14 illustrates an exemplary user interface for the text query method of FIG. 9.

FIG. 14 illustrates an exemplary user interface for the text query method of FIG. 9. This interface 630 requests user entry of a query string 631. The query string 631 can include boolean or other suitable operators. The user can also enter a file location of a file having a long text passage. The user can also provide a date range 632 to narrow the query. In addition, the user can filter the query by specifying stored files to exclude 634.

Returning to FIG. 9, the multimedia query 540 identifies multimedia (audio, video, image) files having content similar to a target content provided by the user. The method first parses query parameters at step 541. At step 542, the method computes a signature for the target content. The query is run at step 543 against the index and the tables. The target signature is passed to the indexer 15 (FIG. 2). The indexer 15 can then return a list of pointers to multimedia files, ranked by similarity to the target content. The method also searches the Source Table 46 (FIG. 2) and Render Table 48 (FIG. 2) based on supplied parameters. The results from the indexer query and the database query are combined to generate a multimedia report to the user at step 544. If the user is an interactive system user, the user can browse the results and modify the query accordingly. To reduce the query effort, the intermediate query results from the indexer query and the database query are temporarily saved, for further use.

Figure 15:
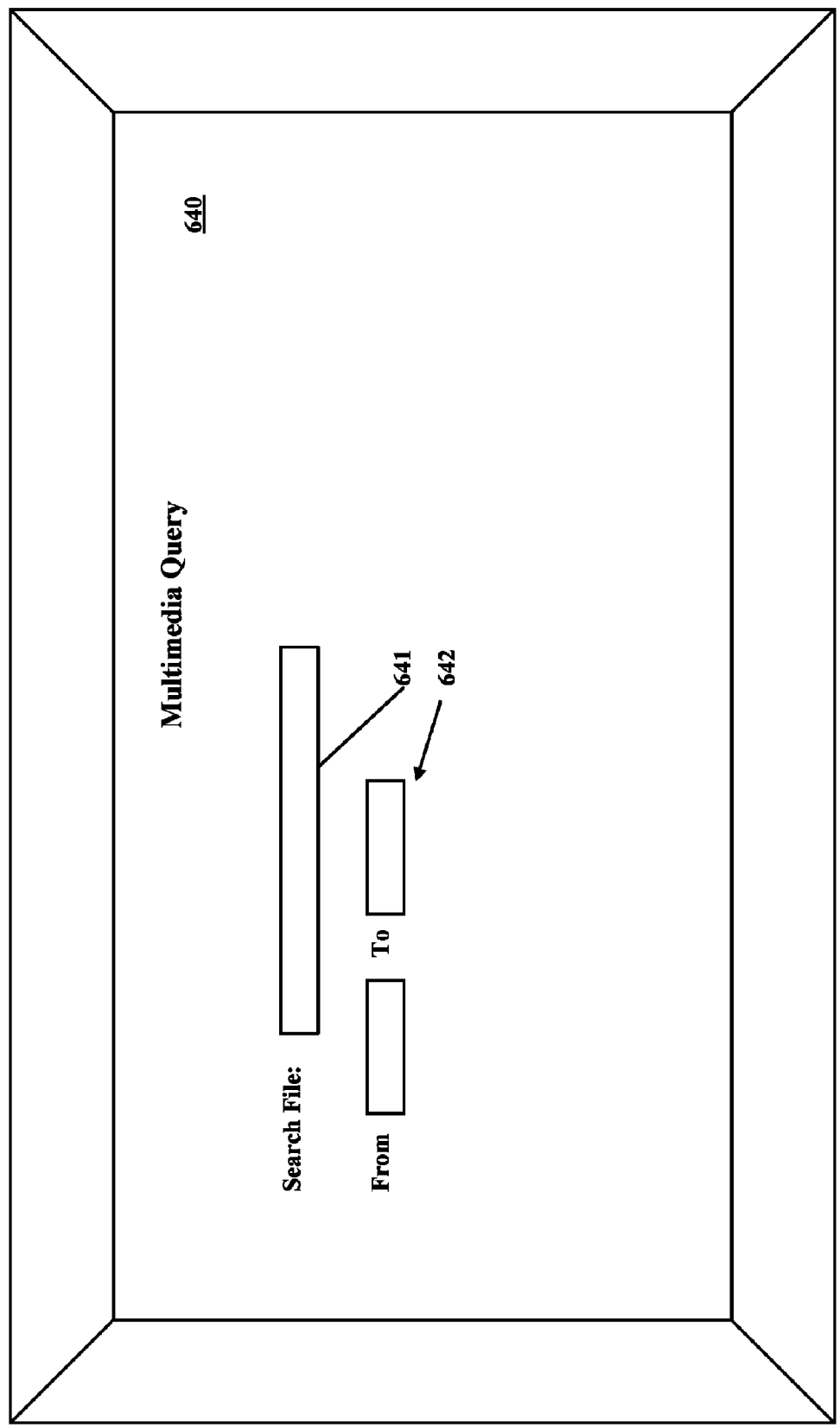
FIG. 15 illustrates an exemplary user interface for the multimedia query method of FIG. 9.

FIG. 15 illustrates an exemplary user interface for the multimedia query method of FIG. 9. This interface 640 requests a filename 641, which can be a local file or a remote file (including network files and Internet files). The query can be limited to a specific date range 642.

Returning to FIG. 9, it should be recognized that the system can support additional queries, such as ad hoc queries 550. At step 551, the query is run, as entered by the user. A report is then generated, at step 552, for presentation to the user.

FIG. 16 illustrates an exemplary user interface for the ad hoc query method of FIG. 9. As shown, this interface 650 permits the user to enter any SQL query 651, which may be stored in a file, whose location is entered by the user.

Additional fields can also be added to the tables 12*a*, such as a file type field in the Source Table 46 or Whois fields in the Whois table 34, to improve query efficiency. Data from the tables 12*a* can also be stored with the files 12*b* as metadata indexed by the indexer. The system can also include fuzzy logic to identify similar, but not exact matches. The system can also incorporate a language translator to facilitate locating foreign language equivalents. Additional queries can also be added to the system to generate useful reports to the user community.

Those of ordinary skill in the art should recognize that methods involved in a data archival and retrieval system for internet worked computers may be embodied in a computer program product that includes a computer-usable medium. For example, such a computer-usable medium can include a readable memory device, such as a solid state memory device, a hard drive device, a CD-ROM, a DVD-ROM, or a computer diskette, having computer-readable program code segments stored thereon. The computer-useable medium can also include a communications or transmission medium, such as a bus or a communications link, either optical, wired, or wireless, having program code segments carried thereon as digital or analog data signals.

While the system has been particularly shown and described with references to particular embodiments, it will be understood by those skilled in the art that various changes in form and details may be made, without departing from the scope of the invention as claimed. For example, embodiments of the invention can be applied to various environments, and are not limited to the described environment. Furthermore, embodiments of the invention are not limited to the archival and retrieval of intellectual property references. As such, various embodiments of the invention can be encompassed by the appended claims.

What is claimed is:

1. A computerized system for retrieving content collected from an electronic address over time, the content associated with an internetworked content provider, comprising:
    a data warehouse including a database storing data in an organized structure, the data associated with a plurality of data files, including an archived original content file having content stored therein as collected from an electronic address over time, the content associated with a content provider, and an archived registration file having Internet domain name registration information stored therein that is related to the content provider associated with the electronic address at the specified time;
    a plurality of modules populating the database with data associated with the data files;
    a searchable electronic index of the content stored within the archived original content file;
    a query engine in communication with the electronic index for retrieving the stored data based on a query parameter and the electronic index;
    a user interface in communication with the query engine for soliciting a query from a user for desired content, the desired content having a match to the content stored within the archived original content file; and
    a query result presented to the user in response to the query and the electronic index, the query result including a reference to the archived original content file and the archived registration file.

2. The system of claim 1 wherein the query solicits desired content of at least one of a text string or a multimedia target.

3. The system of claim 1 wherein the data warehouse is located remote from the user interface.

4. The system of claim 1 wherein the query result is not presented in real time.

5. The system of claim 1 wherein the user interface includes a search engine result identifying a Universal Resource Locator.

6. The system of claim 5 wherein the Universal Resource Locator is responsive to the solicitation for a query.

7. The system of claim 1 wherein the query result includes a history of changes to the data files collected from the electronic address over time.

8. The system of claim 1 wherein the query result includes a history of changes to the Internet domain name information over time.

9. The system of claim 1 wherein the query results are responsive to a query specifying a trademark.

10. The system of claim 1 wherein the query results are responsive to a query specifying a work of authorship.

11. The system of claim 1 wherein the database associates the archived original content file and the archived Internet domain registration information with a content provider based on a time that the archived copy of the original content file was collected from the electronic address.

12. The system of claim 1 wherein the archived original content file includes an image of a browser-executable source code file.

13. A system for storing information for retrieval, comprising:
    a database storing data in an organized structure, the data associated with a plurality of data files, including an archived original content file having content stored therein as collected from an electronic address over time, the content associated with a content provider;
    a plurality of modules populating the database with data associated with the data files;
    a searchable electronic index of the content stored within the archived original content file; and
    a query engine in communication with the electronic index for retrieving the stored data based on a query parameter and the electronic index.

14. The system of claim 13 further comprising an archive storing the data files in perpetuity.

15. The system of claim 14 wherein the database includes references to the data files for retrieval from the archive.

16. The system of claim 13 wherein the content provider includes a content provider selected from at least one of a domain name service registry and a web server.

17. The system of claim 13 wherein the modules communicate with the electronic address over a public access computer network.

18. The system of claim 13 further comprising an indexer, the indexer creating the searchable electronic index.

19. The system of claim 13 wherein the searchable electronic index includes multimedia data.

20. The system of claim 13 wherein the database relates the archived original content file with a time that the archived original content file was collected from the electronic address.

21. The system of claim 13 wherein the archived original content file includes an image of a browser-executable source code file.

22. A computerized system for storage and retrieval of content from a plurality of Internet content providers, the content including registration content and page content, the system comprising:
    a data warehouse structured to store content for later retrieval, the data warehouse including a database storing data in an organized structure, the data associated with a plurality of data files, including an archived original content file having content stored therein as collected from an electronic address over time, the content associated with a content provider;

a plurality of modules populating the database with data associated with the data files, including a registration retrieval mechanism in communication with a plurality of Internet domain name registries for retrieving registration content for a plurality of content providers and storing the retrieved registration content in a plurality of registration files in the data warehouse over time;

a mechanism for associating the stored registration content with a respective time stamp, the time stamp indicating the time that the stored registration content was retrieved by the registration retrieval mechanism;

a searchable electronic index of the the content stored within the archived original content file and the registration content stored within the registration files; and a query engine in communication with the electronic index for retrieving the stored data based on a query parameter and the electronic index.

23. The system of claim 22 further comprising a page retrieval mechanism in communication with a content provider for retrieving page content from the content providers and storing the retrieved content in the data warehouse.

24. The system of claim 22 wherein the database manages the stored registration content.

25. The system of claim 22 wherein the indexer is a multimedia indexer.

26. The system of claim 22 further comprising a query engine coupled to the indexer for retrieving the stored registration content.

27. The system of claim 26 wherein the query engine includes a program interface operable by a remote computer.

28. A computerized system for archiving information from a plurality of internetworked web content providers, comprising:

a data warehouse including a database storing data in an organized structure, the data associated with a plurality of data files, including an archived original content file having content stored therein as collected from an electronic address over time, the content associated with a web content provider;

the database including an identifier of a web content provider;

for the web content provider, information stored in the data files of the data warehouse including:

ownership registration data stored in a registration file;

instructions for operating web browsers stored in a source code file;

an image of a browser-rendered display generated by a web browser as instructed by the instructions in the source code file, the rendered image file generated contemporaneously with the storage of the source code file and stored in a rendered image file;

a plurality of modules populating the database with data associated with the data files, including data associating the web content provider with the stored information;

a searchable electronic index of the content stored within the archived original content file; and a query engine in communication with the electronic index for retrieving the stored data based on a query parameter and the electronic index.

29. The system of claim 28 wherein the identifier is a unique address of the web content provider.

30. The system of claim 29 wherein the unique address is a domain name derived from a domain name registry.

31. The system of claim 28 wherein the stored information is compressed.

32. The system of claim 28 wherein the stored information includes a copy of a multimedia file.

33. The system of claim 28 further comprising an indexer operating on the stored information.

34. The system of claim 33 wherein the indexer includes a digital signature engine operating on multimedia files.

35. The system of claim 28 further comprising a user interface for querying the data warehouse.

36. The system of claim 35 wherein the user interface is operable by a remote computer.

37. The system of claim 36 wherein the remote computer includes a search engine interface.

38. The system of claim 28 wherein the modules comprise web robots to retrieve information from a remote content provider.

39. The system of claim 38 wherein the remote content provider is a registry storing the ownership registration data.

40. The system of claim 38 wherein the remote content provider is the web content provider storing the instructions.

41. The system of claim 28 further comprising a processing module to monitor changes to the instructions at the web content provider, based on the stored source code file.

42. The system of claim 41 wherein the data warehouse stores a prior version and a current version of a changed source code file.

43. The system of claim 28 further comprising a processing module to monitor changes to ownership registration data at a registration content provider based on the stored record of ownership registration data.

44. The system of claim 43 wherein the data warehouse stores a prior version and a current version of a changed record of ownership registration data.

45. The system of claim 28 wherein the data warehouse includes an offline storage medium.

46. The system of claim 28 wherein the web content provider supports a protocol to facilitate the archival of information.

47. The system of claim 28 wherein the database relates the stored information with a time that the stored information was collected for the data warehouse.

48. The system of claim 28 wherein the stored source code file includes an image of a browser-executable source code file.

49. A computerized system for archiving data from a plurality of distinct content providers, the system comprising:

an identification for each content provider of a plurality of content providers, each content provider having ownership information, the ownership information being changeable over time;

a mechanism that stores, for each identified content provider, a file for each version of the ownership information in association with a time stamp in a data archive for later retrieval; and a database structure associating each content provider with its stored ownership information, wherein the database structure tracks changes to the stored ownership information over time.

50. The system of claim 49 wherein the content providers are registered in a shared registry system.

51. The system of claim 50 wherein the stored ownership information includes registration data associated with the registry.

52. The system of claim 50 wherein the content provider is identified by a unique address.

53. The system of claim 49 wherein the mechanism includes a data compression algorithm to reduce the size of the ownership information before storing in the data archive.

54. The system of claim 49 wherein the stored ownership information is maintainable in perpetuity.

55. The system of claim 49 further comprising an indexer for maintaining a searchable index of the stored ownership information.

56. The system of claim 55 wherein the stored ownership information is multimedia content.

57. The system of claim 55 further comprising a query engine coupled to the indexer for processing queries against the stored ownership information.

58. The system of claim 57 wherein the query engine includes a program interface operable by a remote computer.

59. A computerized system for monitoring intellectual property rights across a plurality of internetworked content providers, comprising:
  a data archive including a database storing data in an organized structure, the data associated with a plurality of data files, including an archived original content file having content stored therein as collected from an electronic address over time, the content associated with a web content provider;
  the database including an identifier of a plurality of web content providers;
  for each of a plurality of web content provider, information stored in data files in the data archive, including:
    Internet domain name registration data associated with the web content provider stored in a registration file;
    instructions for operating web browsers as specified by the web content provider stored in a source code file;
    an image of a browser-rendered display generated by a web browser as instructed by the instructions in the source code file, the browser-rendered image being generated contemporaneously with the storage of the source code file and stored in a rendered image file;
  a plurality of modules populating the database with data associated with the data files, including data associating web content providers with the stored information and associating the stored information with a time stamp;
  a searchable electronic index of the content stored within the archived original content file;
  a query engine in communication with the electronic index for retrieving the stored data based on a query parameter and the electronic index; and
  a report responsive to the query parameter, the report including archived information associated at least one web content provider.

60. The system of claim 59 wherein the solicited information is at least one of a trademark, a work of authorship, or an invention.

61. The system of claim 59 wherein the solicited information is entered as a file location.

62. The system of claim 61 wherein the file is at least one of a text file, an audio file, an image file, or a video file.

63. The system of claim 59 wherein the report includes archived information associated with a plurality of network registrars.

64. The system of claim 59 wherein the report includes archived information from a plurality of web content providers.

65. The system of claim 59 wherein the archived information includes obsolete information.

66. The system of claim 59 wherein the stored source code file includes an image of a browser-executable source code file.

67. A computerized method for retrieving content collected from an electronic address over time, the content associated with an internetworked content provider, comprising:
  in a data warehouse having a database, storing data in an organized structure, the data associated with a plurality of data files, including an archived original content file having content stored therein as collected from an electronic address over time, the content associated with a content provider, and an archived registration file having Internet domain name registration information stored therein that is related to a content provider associated with the electronic address at the specified time;
  from a plurality of modules, populating the database with data associated with the data files;
  creating a searchable electronic index of the content stored within the archived original content file stored in the database;
  operating a query engine in communication with the electronic index;
  accepting a query parameter from a user for desired content through a user interface in communication with the query engine, the desired content having a match to original content stored in the archived original content file;
  from the query engine, retrieving the stored data based on the query parameter and the electronic index; and
  presenting a query result to the user, the query result including a reference to the archived original content file and the archived registration file.

68. The method of claim 67 wherein the query parameter comprises a desired content of at least one of a text string or a multimedia target.

69. The method of claim 67 wherein the data warehouse is located remote from the user interface.

70. The method of claim 67 wherein presenting the query result is not performed in real time with the query.

71. The method of claim 67 wherein the query parameter comprises a Universal Resource Locator identified through a search engine result.

72. The method of claim 71 wherein the Universal Resource Locator is responsive to the solicitation for a query.

73. The method of claim 67 wherein the query result includes a history of changes to the data files collected from the electronic address over time.

74. The method of claim 67 wherein the query result includes a history of changes to the Internet domain name information over time.

75. The method of claim 67 wherein the query results are responsive to a query specifying a trademark.

76. The method of claim 67 wherein the query results are responsive to a query specifying a work of authorship.

77. A method for storing information for retrieval, comprising:
  storing data in an organized structure in a database, the data associated with a plurality of data files, including an archived original content file having content stored therein as collected from an electronic address over time, the content associated with a content provider;
  from a plurality of modules, populating the database with data associated with the data files;
  creating a searchable electronic index of the content stored within the archived original content file;
  accepting a query parameter into a query engine in communication with the electronic index; and
  retrieving the stored data based on the query parameter and the electronic index.

78. The method of claim 77 further comprising storing the data files in perpetuity.

79. The method of claim 77 wherein the content provider includes a content provider selected from at least one of a domain name service registry and a web server.

80. The method of claim 77 wherein the modules communicate with the electronic address over a public access computer network.

81. The method of claim 77 further comprising an indexer, the indexer creating the searchable electronic index.

82. A computerized method for storage and retrieval of content from a plurality of Internet content providers, the content including registration content and page content, the method comprising:
storing data in an organized structure in a data warehouse having a database, the data associated with a plurality of data files, including an archived original content file having content stored therein as collected from an electronic address over time, the content associated with a content provider;
from a plurality of modules, populating the data warehouse with the data files including retrieving registration content for a plurality of web content providers from a plurality of Internet domain name registries and storing the retrieved registration content in a plurality of registration files in the data warehouse over time;
associating the stored registration content with a respective time stamp, the time stamp indicating the time that the stored registration content was retrieved from the respective Internet domain name registry;
creating a searchable electronic index stored in the database of the registration content stored within the archived original content file and the registration content stored within the registration files;
accepting a query parameter into a query engine in communication with the electronic index; and
retrieving the stored data based on the query parameter and the electronic index.

83. The method of claim 82 further comprising retrieving page content from the web content providers and storing the retrieved page content in the data warehouse.

84. The method of claim 82 further comprising accessing the searchable electronic index using a query engine.

85. A computerized method for archiving information from a plurality of internetworked web content providers, comprising:
connecting a machine to a data warehouse having data storage that is accessible by the machine;
storing data in an organized structure in a database of the data warehouse, the data associated with a plurality of data files, including an archived original content file having content stored therein as collected from an electronic address over time, the content associated with a content provider;
storing an identifier of a web content provider in the data warehouse;
for the web content provider, storing information in the data files of the data warehouse, the stored information including:
ownership registration data stored in a registration file;
instructions for operating web browsers stored in a source code file;
an image of a browser-rendered display generated by a web browser as instructed by the instructions in the source code file, the rendered image file generated contemporaneously with the storage of the source code file and stored in a rendered image file;
from a plurality of modules, populating the data warehouse with the data files and associating the web content provider with the stored information;
creating a searchable electronic index of the content stored within the archived original content file;
accepting a query parameter into a query engine in communication with the electronic index; and
retrieving the stored data based on the query parameter and the electronic index.

86. The method of claim 85 wherein the identifier is a unique address of the web content provider.

87. The method of claim 86 wherein the unique address is a domain name derived from a domain name registry.

88. The method of claim 85 wherein the stored information is compressed.

89. The method of claim 85 wherein the stored information includes a copy of a multimedia file.

90. The method of claim 85 further comprising operating on the stored information using an indexer.

91. The method of claim 90 wherein the indexer includes a digital signature engine operating on multimedia files.

92. The method of claim 85 further comprising for querying the data warehouse through a user interface.

93. The method of claim 92 wherein the user interface is operable by a remote computer.

94. The method of claim 93 wherein the remote computer includes a search engine interface.

95. The method of claim 85 populating the database comprises operating web robots to retrieve information from a remote content provider.

96. The method of claim 95 wherein the remote content provider is a registry storing the ownership registration data.

97. The method of claim 85 further comprising monitoring changes to instructions at the web content provider, based on the stored source code.

98. The method of claim 85 further comprising monitoring changes to ownership registration data at a registration content provider based on the stored record of ownership registration data.

99. The method of claim 85 wherein the data warehouse includes an offline storage medium.

100. A computerized method for archiving data from a plurality of distinct content providers, the method comprising:
connecting a machine to a data archive having data storage that is accessible by the machine;
machine storing in the data archive an identification for each content provider of a plurality of content providers, each content provider having ownership information, the ownership information being changeable over time;
machine storing, for each identified content provider, a file for each version of the ownership information in association with a time stamp in the data archive for later retrieval; and
machine tracking changes to the stored ownership information over time.

101. The method of claim 100 wherein the ownership information includes registration data associated with a shared registry.

102. The method of claim 100 wherein storing the content comprises using a data compression algorithm to reduce the size of the ownership information before storing in the data archive.

103. The method of claim 100 wherein the stored ownership information is maintainable in perpetuity.

104. The method of claim 100 further comprising maintaining a searchable index of the stored ownership information.

105. A method for monitoring intellectual property rights across a plurality of internetworked content providers, comprising:

connecting a machine to a data archive having data storage that is accessible by the machine;

storing data in an organized structure in a database of the data archive, the data associated with a plurality of data files, including an archived original content file having content stored therein as collected from an electronic address over time, the content associated with a web content provider;

providing an identifier in the database of a plurality of web content providers;

for each of a plurality of content provider, machine storing information in the data archive, including:

Internet domain name registration data associated with the content provider stored in a registration file;

instructions for operating web browsers as specified by the web content provider stored in a source code file;

an image of a browser-rendered display generated by a web browser as instructed by the instructions in the source code file, the browser-rendered image being generated contemporaneously with the storage of the source code file and stored in a rendered image file;

from a plurality of modules, populating the database with data associated with the data files, including data associating web content providers with the stored information and associating the stored information with a time stamp;

creating a searchable electronic index of the content stored within the archived original content file;

accepting a query parameter into a query engine in communication with the electronic index;

retrieving the stored data based on the query parameter and the electronic index; and presenting a report responsive to the query parameter, the report including archived information associated at least one web content provider.

106. The method of claim 105 wherein the query parameter is at least one of a trademark, a work of authorship, or an invention.

107. The method of claim 105 wherein query parameter comprises a file location.

108. The method of claim 107 wherein the file is at least one of a text file, an audio file, an image file, or a video file.

109. The method of claim 105 wherein the report includes archived information associated with a plurality of network registrars.

110. The method of claim 105 wherein the report includes archived information from a plurality of web content providers.

111. The method of claim 105 wherein the archived information includes obsolete information.

112. An article of manufacture, comprising:
a computer-usable medium; and
a set of computer instructions embodied on the medium for operating a computer, the computer instructions including computer instructions that cause a computer to perform a computerized method for retrieving content collected from an electronic address over time, the content associated with an internetworked content provider, comprising computer instructions for:

in a data warehouse having data storage accessible by a computer, storing a plurality of data files, including an archived original content file having original content stored therein as collected from an electronic address at a specified time and an archived registration file having Internet domain name registration information stored therein that is related to a content provider associated with the electronic address at the specified time;

storing a searchable electronic index of the original content stored in the archived original content file;

providing a query engine in communication with the electronic index;

soliciting a query from a user for desired content through a user interface in communication with the query engine, the desired content having a match to original content stored in the archived original content file;

presenting a query result to the user in response to the query and the electronic index, the query result including a reference to the archived original content file and the archived registration file.

113. An article of manufacture, comprising:
a computer-usable medium; and
a set of computer instructions embodied on the medium for operating a computer, the computer instructions including computer instructions that cause a computer to perform a computerized method for storing information for retrieval, comprising computer instructions for:

storing data in an organized structure in a database, the data associated with a plurality of data files, including an archived original content file having content stored therein as collected from an electronic address over time, the content associated with a content provider;

from a plurality of modules, populating the database with the data files;

creating a searchable electronic index of the content stored within the archived original content file stored in the database;

accepting a query parameter into a query engine in communication with the electronic index; and retrieving the stored data based on the query parameter and the electronic index.

114. An article of manufacture, comprising:
a computer-usable medium; and
a set of computer instructions embodied on the medium for operating a computer, the computer instructions including computer instructions that cause a computer to perform a computerized method for storage and retrieval of content from a plurality of Internet content providers, the content including registration content and page content, the method comprising computer instructions for:

storing content for later retrieval in a data warehouse; and retrieving registration content for a plurality of web content providers from a plurality of Internet domain name registries and storing the retrieved registration content in a plurality of registration files in the data warehouse over time;

associating the stored registration content with a respective time stamp, the time stamp indicating the time that the stored registration content was retrieved from the respective Internet domain name registry; and creating a searchable electronic index of the registration content stored in the registration files.

115. An article of manufacture, comprising:
a computer-usable medium; and
a set of computer instructions embodied on the medium for operating a computer, the computer instructions including computer instructions that cause a computer to perform a computerized method for archiving information from a plurality of internetworked web content providers, comprising computer instructions for:

storing an identifier of a web content provider in a data warehouse;

for the web content provider, storing information in the data warehouse including:

ownership registration data stored in a registration file;

instructions for operating web browsers stored in a source code file;

an image of a browser-rendered display generated by a web browser as instructed by the instructions in the source code file, the rendered image file generated contemporaneously with the storage of the source code file and stored in a rendered image file; and associating the web content provider with the stored information in a database.

116. An article of manufacture, comprising:

a computer-usable medium; and a set of computer instructions embodied on the medium for operating a computer, the computer instructions including computer instructions that cause a computer to perform a computerized method for archiving data from a plurality of distinct content providers, each content provider having ownership information, the ownership information being changeable over time, comprising computer instructions for:

connecting the computer to a data archive having data storage that is accessible by the computer;

storing an identification for each content provider of a plurality of content providers;

storing, for each identified content provider, a file for each version of the ownership information in association with a time stamp in a data archive for later retrieval; and tracking changes to the stored ownership information over time.

117. An article of manufacture, comprising:

a computer-usable medium; and a set of computer instructions embodied on the medium for operating a computer, the computer instructions including computer instructions that cause a computer to perform a method for monitoring intellectual property rights across a plurality of internetworked content providers, comprising computer instructions for:

providing an identifier of a plurality of web content providers;

for each of a plurality of content provider, storing searchable information in the data archive, including:

Internet domain name registration data associated with the content provider stored in a registration file;

instructions for operating web browsers as specified by the web content provider stored in a source code file;

an image of a browser-rendered display generated by a web browser as instructed by the instructions in the source code file, the browser-rendered image being generated contemporaneously with the storage of the source code file and stored in a rendered image file;

a database associating web content providers with the stored information and associating the stored information with a time stamp;

soliciting information from the data archive related to the searchable information and a specified time; and presenting a report responsive to the query information, the report including archived information associated at least one content provider.

* * * * *